US008480445B2

(12) United States Patent
Morvillo

(10) Patent No.: US 8,480,445 B2
(45) Date of Patent: Jul. 9, 2013

(54) SYSTEM AND METHOD FOR CONTROLLING A MARINE VESSEL

(76) Inventor: Robert A. Morvillo, Belmont, MA (US)

( * ) Notice: Subject to any disclaimer, the term of this patent is extended or adjusted under 35 U.S.C. 154(b) by 0 days.

(21) Appl. No.: 12/624,994

(22) Filed: Nov. 24, 2009

(65) Prior Publication Data

US 2010/0070119 A1 Mar. 18, 2010

Related U.S. Application Data

(63) Continuation of application No. 11/286,768, filed on Nov. 24, 2005, now Pat. No. 7,641,525.

(60) Provisional application No. 60/630,818, filed on Nov. 24, 2004, provisional application No. 60/682,218, filed on May 18, 2005.

(51) Int. Cl.
*B63H 11/107* (2006.01)
(52) U.S. Cl.
USPC .............................................. 440/40; 440/42
(58) Field of Classification Search
USPC .............. 440/40–42; 701/21; 114/146, 145 R
See application file for complete search history.

(56) References Cited

U.S. PATENT DOCUMENTS

| 1,641,567 A | | 9/1927 | Barling |
| 3,258,916 A | | 7/1966 | Guenther |
| 3,272,171 A | * | 9/1966 | Korcak ..................... 114/145 R |
| 3,756,185 A | | 9/1973 | Breslin |
| 4,519,335 A | | 5/1985 | Krautkremer et al. |
| 4,538,997 A | | 9/1985 | Haglund |
| 4,691,659 A | | 9/1987 | Ito et al. |
| 4,747,359 A | | 5/1988 | Ueno |
| 4,992,065 A | | 2/1991 | Torneman et al. |
| 5,031,561 A | | 7/1991 | Nilsson |
| 5,145,426 A | | 9/1992 | Kobayashi et al. |

(Continued)

FOREIGN PATENT DOCUMENTS

| DE | 3222054 A1 | 12/1983 |
| DE | 4033674 | 7/1991 |

(Continued)

OTHER PUBLICATIONS

PCT International Search Report PCT/US2005/042776 dated Apr. 6, 2006.

(Continued)

*Primary Examiner* — Edwin Swinehart
(74) *Attorney, Agent, or Firm* — Wolf, Greenfield & Sacks, P.C.

(57) ABSTRACT

A method for controlling a marine vessel having first and second steering nozzles and first and second trim deflectors comprises generating at least a first set of actuator control signals and a second set of actuator control signals. The first set of actuator control signals is coupled to and controls the first and second steering nozzles, and the second set of actuator control signals is coupled to and controls the first and second trim deflectors. The acts of generating and coupling the first set of actuator control signals and the second set of actuator control signals result in inducing any of a net yawing force, a net rolling force, and a net trimming force to the marine vessel without inducing any other substantial forces to the marine vessel by controlling the first and second steering nozzles and the first and second trim deflectors. Also disclosed is a system for controlling a marine vessel.

28 Claims, 22 Drawing Sheets

U.S. PATENT DOCUMENTS

| | | | |
|---|---|---|---|
| 5,203,728 A | 4/1993 | Kobayashi | |
| 5,421,753 A | 6/1995 | Roos | |
| 5,474,012 A | 12/1995 | Yamada et al. | |
| 5,579,711 A | 12/1996 | Thomas | |
| 5,664,978 A | 9/1997 | Howe | |
| 5,713,770 A | 2/1998 | Ambli | |
| 6,193,571 B1 | 2/2001 | Burg | |
| 6,230,642 B1 * | 5/2001 | McKenney et al. | 114/150 |
| 6,234,100 B1 | 5/2001 | Fadeley et al. | |
| 6,234,853 B1 | 5/2001 | Lanyi et al. | |
| 6,238,257 B1 | 5/2001 | Platzer et al. | |
| 6,308,651 B2 | 10/2001 | McKenney et al. | |
| 6,361,385 B1 | 3/2002 | Bland et al. | |
| 6,363,875 B1 | 4/2002 | Griffith et al. | |
| 6,386,930 B2 | 5/2002 | Moffet | |
| 6,401,644 B2 | 6/2002 | Fadeley et al. | |
| 6,447,349 B1 | 9/2002 | Fadeley et al. | |
| 6,453,835 B2 | 9/2002 | Fadeley et al. | |
| 6,520,104 B1 | 2/2003 | Svensson | |
| 6,524,146 B2 | 2/2003 | Spade et al. | |
| 6,604,479 B2 | 8/2003 | McKenney et al. | |
| 6,652,333 B1 | 11/2003 | Adomeit | |
| 6,865,996 B2 | 3/2005 | Borrett | |
| 7,037,150 B2 | 5/2006 | Morvillo | |
| 7,052,338 B2 | 5/2006 | Morvillo | |
| 7,168,996 B2 | 1/2007 | Morvillo | |
| 7,500,890 B2 | 3/2009 | Morvillo | |
| 2001/0029134 A1 | 10/2001 | Moffet | |
| 2003/0054707 A1 | 3/2003 | Morvillo | |
| 2003/0077954 A1 | 4/2003 | Fadeley et al. | |
| 2003/0079668 A1 | 5/2003 | Morvillo | |
| 2005/0042951 A1 | 2/2005 | Morvillo | |
| 2006/0121803 A1 | 6/2006 | Morvillo | |
| 2006/0148342 A1 | 7/2006 | Morvillo | |
| 2006/9014834 | 7/2006 | Morvillo | |

FOREIGN PATENT DOCUMENTS

| | | |
|---|---|---|
| EP | 0035859 | 9/1981 |
| EP | 0778196 | 6/1997 |
| WO | 9620105 | 7/1996 |
| WO | 0134463 | 5/2001 |
| WO | 03029655 | 4/2003 |
| WO | 2005009839 | 2/2005 |

OTHER PUBLICATIONS

Servo Comander Dual Drive Brochure, SKT/Styr-Kontroll Teknik AB; BN Marin Elektronik, Sweden (1996).

Bird-Johnson/PDI Brochure.

Printout from Ultradynamics Web Page, May 13, 2002.

Rolls-Royce A-Series Instruction Manual Kamewa Water Jets, Jun. 26, 2000, pp. 15-54.

"Remote Manoevre Controller—Dual Drive and Quadruple Drive Captain's Instruction," Sty-Kontroll Teknik AB, Stockholm, Sweden, Jul. 1994.

PCT International Search Report PCT/US08/30928 dated Apr. 29, 2003.

PCT International Search Report PCT/US2004/022838 dated Nov. 24, 2004.

PCT International Search Report PCT/US2006/046518 dated Apr. 24, 2007.

SKT Brochure, 1991.

* cited by examiner

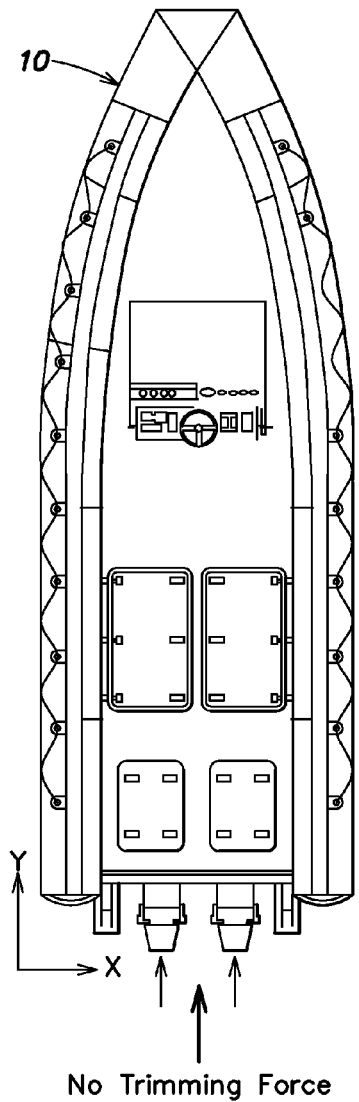
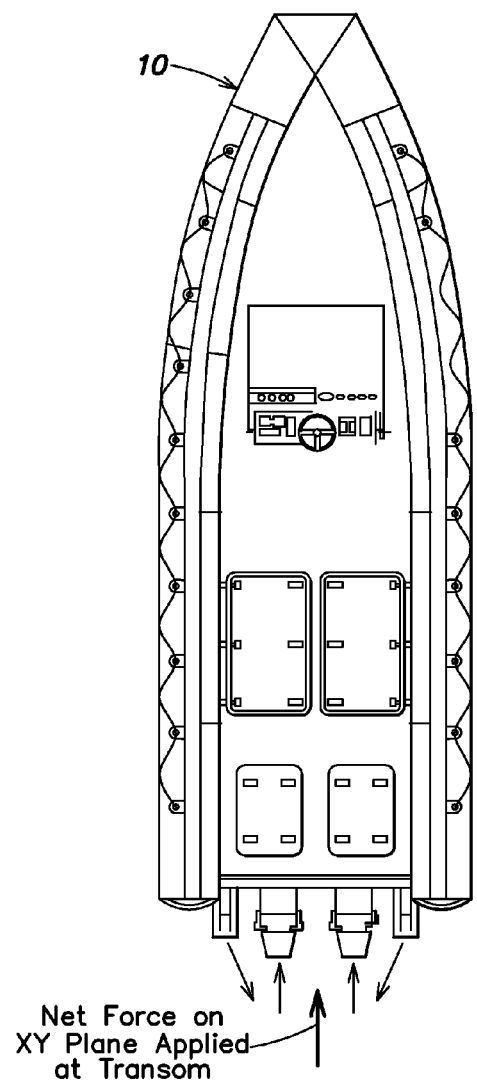
No Trimming Force
FIG. 2a
Net Force on XY Plane Applied at Transom
FIG. 2b
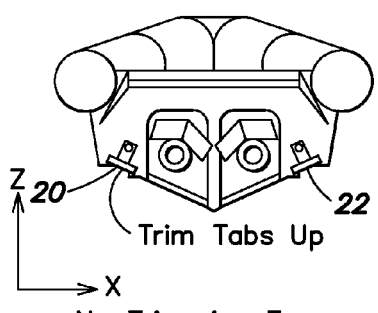
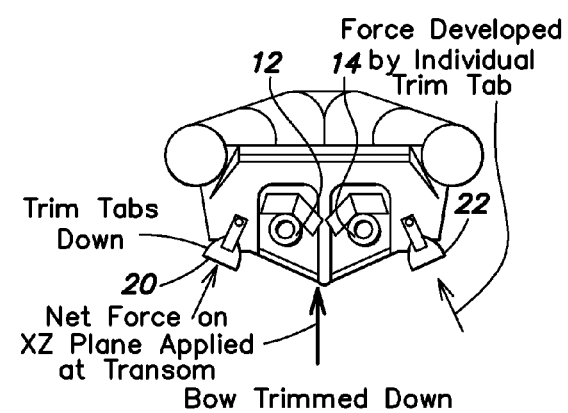
Trim Tabs Up
No Trimming Force
FIG. 2c
Force Developed by Individual Trim Tab
Trim Tabs Down
Net Force on XZ Plane Applied at Transom
Bow Trimmed Down
FIG. 2d

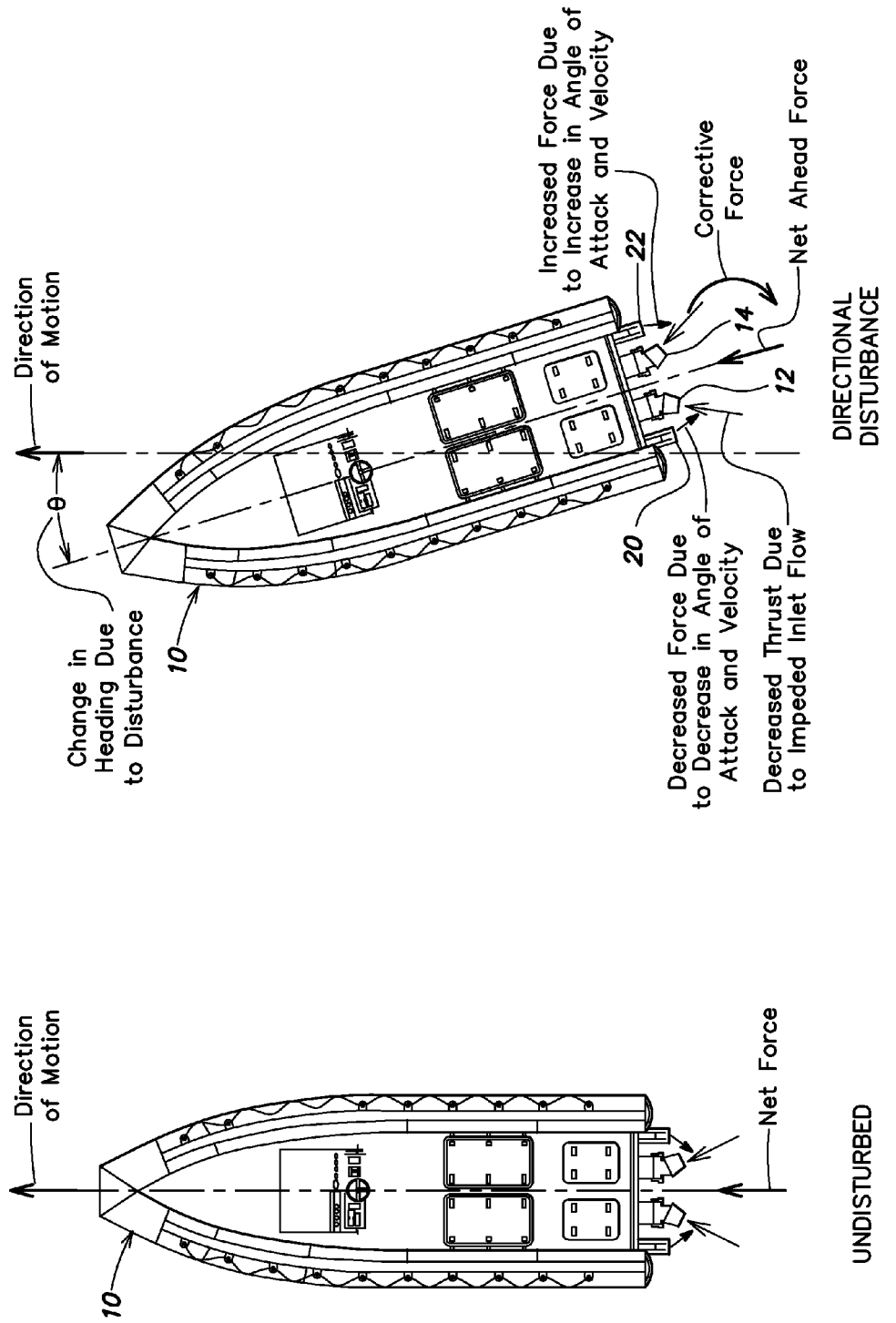

Configuration for Stabilized Operation

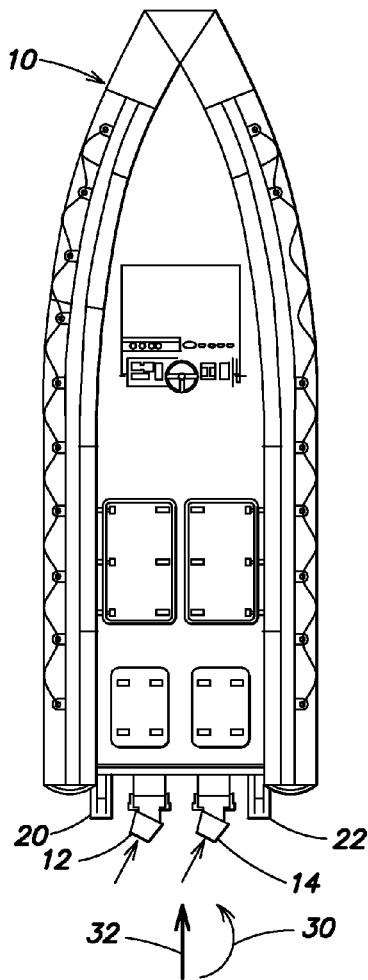
*FIG. 4a* — Turning to Port With Nozzles Only
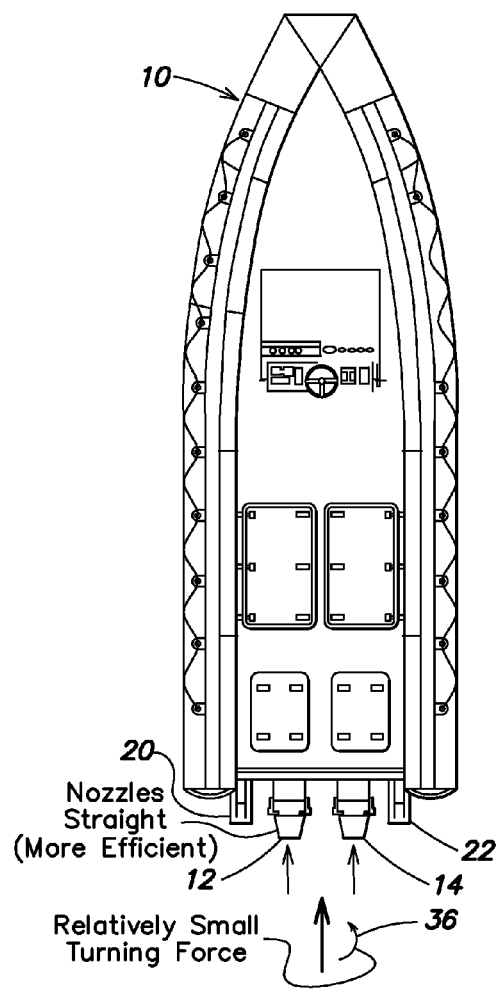
*FIG. 4b* — Turning to Port With Trim-Tabs/Interceptors Only
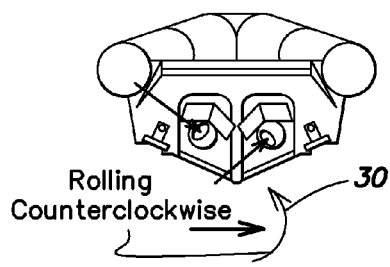
*FIG. 4d* — Turning to Port With Nozzles Only
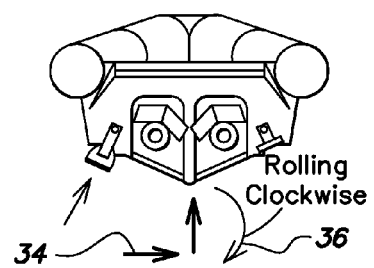
*FIG. 4e* — Turning to Port With Trim-Tabs/Interceptors Only Turning to Port With Nozzles and Trim-Tabs/Interceptors Roll Command Using Trimtab and Nozzle to Cancel Yaw Turning to Port With Nozzles and Trim-Tabs/Interceptors

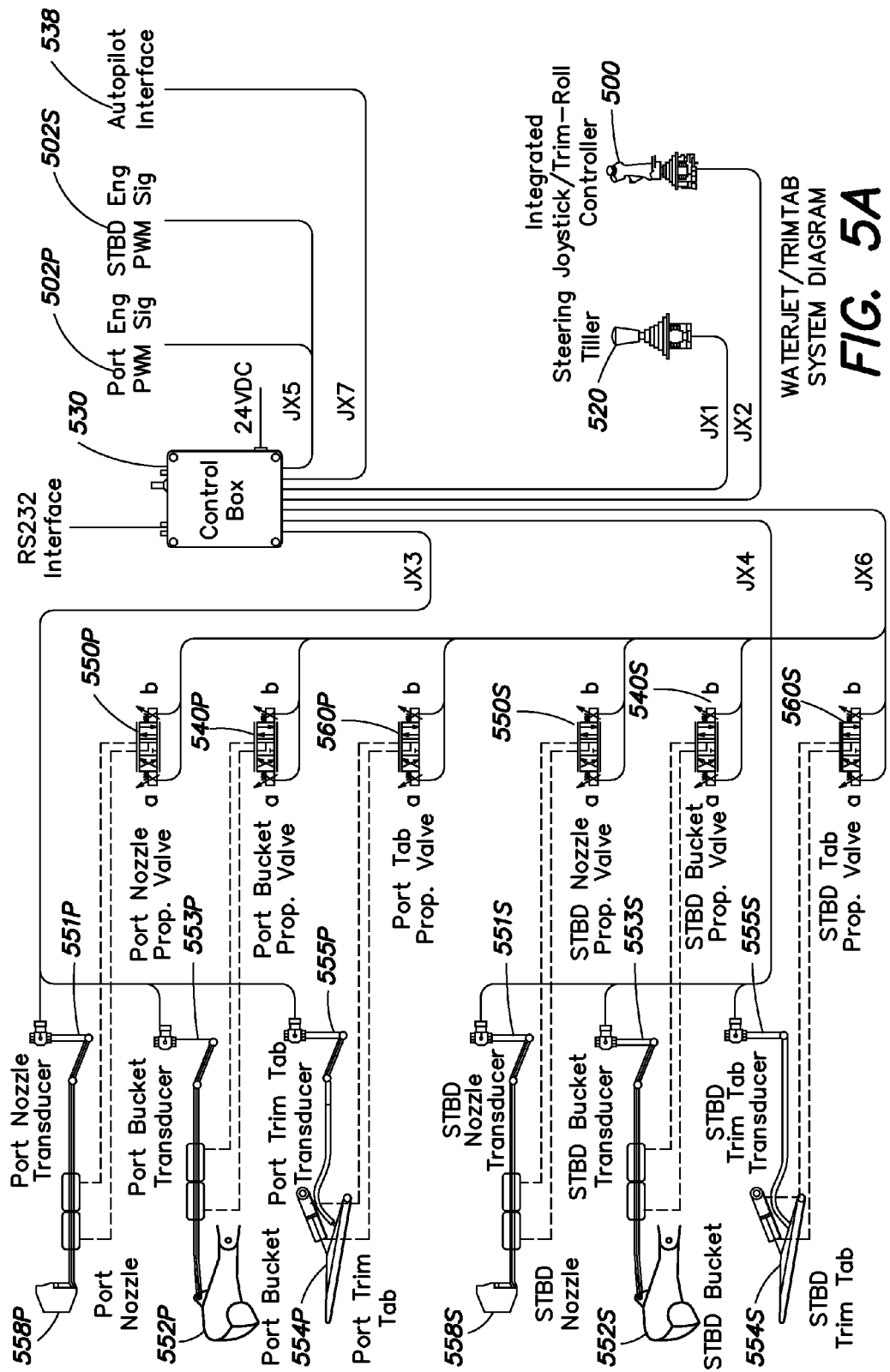
FIG. 5A WATERJET/TRIMTAB SYSTEM DIAGRAM

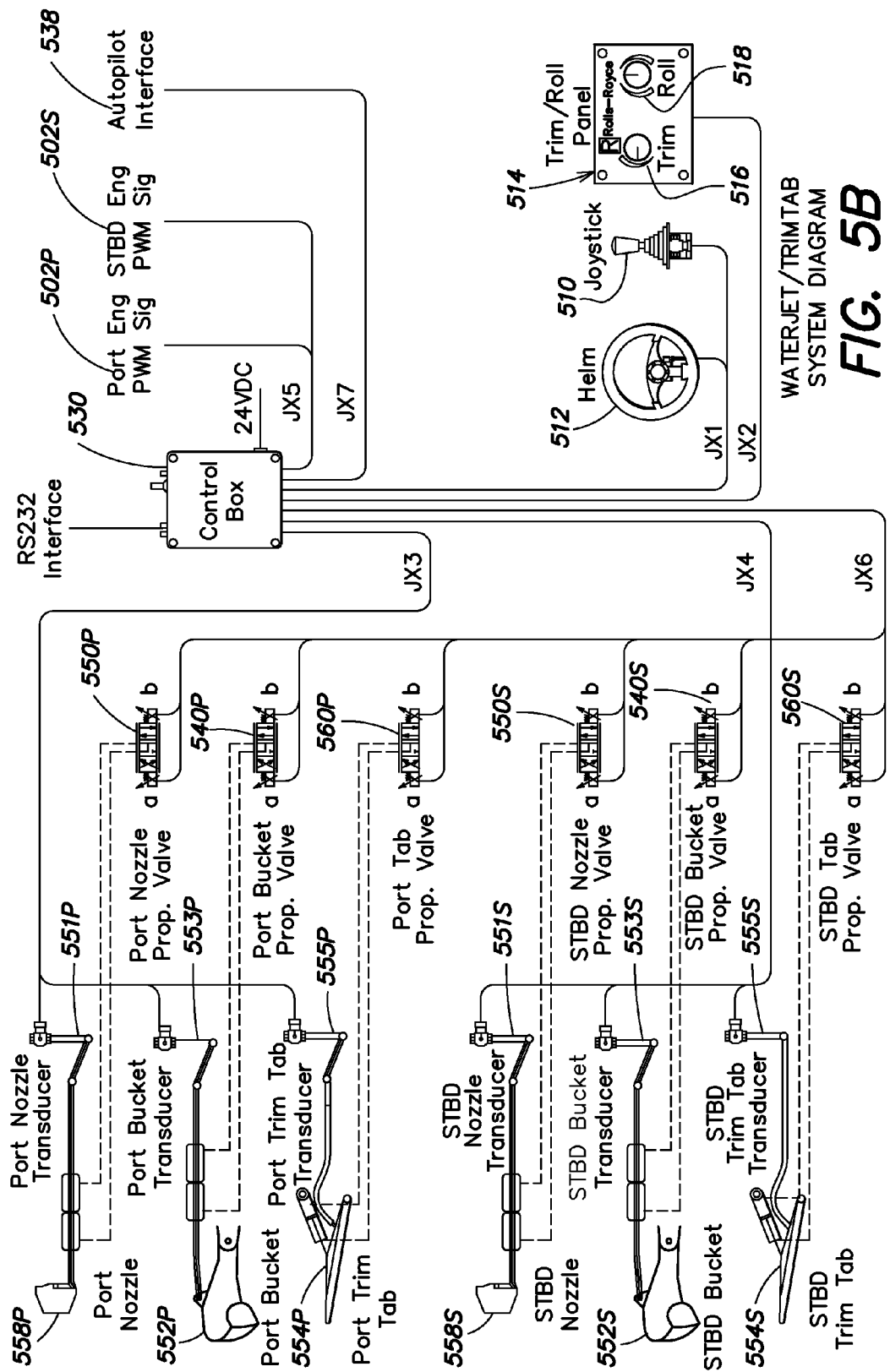
FIG. 5B  WATERJET/TRIMTAB SYSTEM DIAGRAM

Trim-Tab (200)

Interceptor (206)

Steady-State Steering/Trim Roll Control System

SYSTEM AND METHOD FOR CONTROLLING A MARINE VESSEL

RELATED APPLICATIONS

This application is a continuation of and also claims priority under 35 U.S.C. §120 to U.S. patent application Ser. No. 11/286,768, which was filed on Nov. 24, 2005, and claims priority under 35 U.S.C. §119(e), to U.S. provisional patent application Ser. No. 60/630,818, which was filed on Nov. 24, 2004. U.S. patent application Ser. No. 11/286,768 also claims priority, under 35 U.S.C. §119(e), to U.S. provisional patent application Ser. No. 60/682,218, which was filed on May 18, 2005. Each of the above-identified applications is herein incorporated by reference.

FIELD OF THE INVENTION

The present invention relates to marine vessel propulsion and control systems. More particularly, aspects of the invention relate to control devices and methods for controlling the movement of a marine vessel having waterjet propulsion apparatus and trim deflectors.

DESCRIPTION OF THE RELATED ART

Marine vessels have a wide variety uses for transportation of people and cargo across bodies of water. These uses include fishing, military and recreational activities. Marine vessels may move on the water surface as surface ships do, as well as move beneath the water surface, as submarines do. Some marine vessels use propulsion and control systems.

Various forms of propulsion have been used to propel marine vessels over or through the water. One type of propulsion system comprises a prime mover, such as an engine or a turbine, which converts energy into a rotation that is transferred to one or more propellers having blades in contact with the surrounding water. The rotational energy in a propeller is transferred by contoured surfaces of the propeller blades into a force or "thrust" which propels the marine vessel. As the propeller blades push water in one direction, thrust and vessel motion are generated in the opposite direction. Many shapes and geometries for propeller-type propulsion systems are known.

Other marine vessel propulsion systems utilize water jet propulsion to achieve similar results. Such devices include a pump, a water intake or suction port and an exit or discharge port, which generate a water jet stream that propels the marine vessel. The water jet stream may be deflected using a "deflector" to provide marine vessel control by redirecting some water jet stream thrust in a suitable direction and in a suitable amount.

In some applications, such as in ferries, military water craft, and leisure craft, it has been found that propulsion using water jets is especially useful. In some instances, water jet propulsion can provide a high degree of maneuverability when used in conjunction with marine vessel controls that are specially-designed for use with water jet propulsion systems.

It is sometimes more convenient and efficient to construct a marine vessel propulsion system such that the net thrust generated by the propulsion system is always in the forward direction. The "forward" direction or "ahead" direction is along a vector pointing from the stern, or aft end of the vessel, to its bow, or front end of the vessel. By contrast, the "reverse", "astern" or "backing" directing is along a vector pointing in the opposite direction (or 180° away) from the forward direction. The axis defined by a straight line connecting a vessel's bow to its stern is referred to herein as the "major axis" of the vessel. A vessel has only one major axis. Any axis perpendicular to the major axis is referred to herein as a "minor axis." A vessel has a plurality of minor axes, lying in a plane perpendicular to the major axis. Some marine vessels have propulsion systems which primarily provide thrust only along the vessel's major axis, in the forward or backward directions. Other thrust directions, along the minor axes, are generated with awkward or inefficient auxiliary control surfaces, rudders, planes, deflectors, etc. Rather than reversing the direction of a ship's propeller or water jet streams, it may be advantageous to have the propulsion system remain engaged in the forward direction while providing other mechanisms for redirecting the water flow to provide the desired maneuvers.

One example of a device that redirects or deflects a water jet stream is a conventional "reversing bucket," found on many water jet propulsion marine vessels. A reversing bucket deflects water, and is hence also referred to herein as a "reversing deflector." The reversing deflector generally comprises a deflector that is contoured to at least partially reverse a component of the flow direction of the water jet stream from its original direction to an opposite direction. The reversing deflector is selectively placed in the water jet stream (sometimes in only a portion of the water jet stream) and acts to generate a backing thrust, or force in the backing direction.

A reversing deflector may thus be partially deployed, placing it only partially in the water jet stream, to generate a variable amount of backing thrust. By so controlling the reversing deflector and the water jet stream, an operator of a marine vessel may control the forward and backwards direction and speed of the vessel.

A requirement for safe and useful operation of marine vessels is the ability to steer the vessel from side to side. Some systems, commonly used with propeller-driven vessels, employ "rudders" for this purpose. A rudder is generally a planar water deflector or control surface, placed vertically into the water, and parallel to a direction of motion, such that left-to-right deflection of the rudder, and a corresponding deflection of a flow of water over the rudder, provides steering for the marine vessel.

Other systems for steering marine vessels, commonly used in water jet stream propelled vessels, rotate the exit or discharge nozzle of the water jet stream from one side to another. Such a nozzle is sometimes referred to as a "steering nozzle." Hydraulic actuators may be used to rotate an articulated steering nozzle so that the aft end of the marine vessel experiences a sideways thrust in addition to any forward or backing force of the water jet stream. The reaction of the marine vessel to the side-to-side movement of the steering nozzle will be in accordance with the laws of motion and conservation of momentum principles, and will depend on the dynamics of the marine vessel design.

A primary reason why waterjet powered craft are extremely efficient at high speeds is the lack of appendages located bellow the waterline. Typical appendages that can be found on non-waterjet driven craft (i.e., propeller driven) are rudders, propeller shafts, and propeller struts. These appendages can develop significant resistance, particularly at high speeds.

The lack of appendages on waterjet driven craft also provides a significant advantage in shallow water, as these craft typically have much shallower draught and are less susceptible to damage when run aground, as compared to craft with propellers bellow the hull.

Notwithstanding the negative effects on craft resistance, some appendages are of considerable value with respect to other craft dynamic characteristics. Although a significant source of drag at high speeds, a rudder is a primary contributor to craft stability when moving forward through the water, particularly when traveling at slow to medium speeds.

In simple terms, a rudder is a foil with a variable angle of attack. Actively varying the angle of attack (e.g., a turning maneuver) will increase the hydrodynamic force on one side of the rudder and decrease the hydrodynamic force on the opposite side, thereby developing a net force with a transverse component to yaw the craft in the desired direction.

When the rudder is maintained in a neutral position (e.g., moving straight ahead) the rudder helps to maintain the craft on a steady course. Heading changes to the craft that are caused by external yawing disturbances such as wind or waves and not rudder movements will change the rudder angle of attack such that a yawing force will be developed at the rudder in the opposite direction of the disturbance, thereby minimizing the effect of the disturbance. Other secondary effects of appendages also contribute to craft stability such as developing drag at a point aft of the point of the applied thrust.

In contrast, most waterjet driven craft have little or no passive ability to develop restoring forces to counter outside yawing disturbances. Yawing disturbances must be countered by actively changing the direction of the waterjet stream through the use of a deflecting device such as a steering nozzle. Thus, an operator of a waterjet driven vessel may constantly be moving the steering nozzle, e.g. with the helm control, to counter the external yawing forces.

Another feature of some propeller driven craft that is lacking in most waterjet driven craft is the ability to develop a downward trimming force at the transom. Many craft are equipped with lifting devices known as trim-tabs 200 or interceptors 206 Referring to FIG. 7, a trim tab 200 can be thought of as a variable-angle wedge that mounts to the transom 203 of a vessel and when engaged with a water stream creates upward force 204 on both the trim tab 200 and the hull bottom 205. Varying the Actuator 201 position will create varying amounts of hydrodynamic force 204 on the vessel. For example, extending the actuator 201 so as to actuate the trim tab further into the water stream will increase the angle of attack of the wedge, thereby increasing the hydrodynamic force 204 on the vessel. In contrast, referring to FIG. 8, an interceptor 206, mounted to transom 203 of a vessel and actuated by actuator 207, intercepts the flow of water under the transom of the vessel with a small blade 206 and creates an upward hydrodynamic force on the hull bottom 205. These devices that are found in both propeller and waterjet driven craft can be actuated to develop a hydrodynamic lifting force at the transom (stern) to trim the bow down, assisting the craft in getting up on plane. Under some sea and/or weather conditions, however, it is desired to bring the bow of the craft up in order to prevent "stuffing". "Stuffing" is an undesirable and sometimes violent occurrence when the bow of a craft is forced down into the water such that some forward portion of the craft is temporarily submerged. Trim-tabs 200 or interceptors 206 are incapable of developing downward forces at the stern. However, craft equipped with trimmable outboard or stern propeller drives can substantially mitigate the occurrence of stuffing by actuating the position of the drive such that a downward force is developed at the transom in addition to the primary forward component.

It should be understood that while particular control surfaces are primarily designed to provide force or motion in a particular direction, these surfaces often also provide forces in other directions as well. For example, a steering nozzle, which is primarily intended to develop a yawing moment on the craft, in many cases will develop a rolling or healing effect. This is due to the relative orientation of the nozzle turning axis. Referring, for illustration purposes, to FIG. 1c, it is to be appreciated that in many waterjet propelled craft, the rotational axis of the steering nozzle 12, 14 is orthogonal to the bottom surface 16, 18 of the craft such that the rotational (transverse) thrust component generated by the steering nozzle is applied in a direction parallel to the bottom surface of the craft. Because of, for example the V-shaped or deep V-shaped hull, the rotational thrust component is generated at an angle (with respect to a horizontal surface) close or equal to the dead rise angle of the hull at the transom, which thereby causes a rolling or healing moment in addition to a yawing (rotational) moment. The net rolling/healing force imposed on a dual waterjet propelled craft can be equal to twice the force developed by a single waterjet. This is because the nozzles are typically controlled in unison when a waterjet driven craft is in a forward cruising or transiting mode.

Similarly, trim tabs and interceptors 20, 22 are generally mounted at the transom 24, close to the free surface of the water such that a trimming force is developed orthogonal or perpendicular to the bottom surface 16, 18 of the hull at the transom. While the purpose of the trim tabs and interceptors is to develop up/down trimming forces at the transom, an inward component is also developed because a force is developed at an angle (with respect to a horizontal surface) close or equal to the dead rise angle of the hull at the transom plus 90 degrees. When both tabs or interceptors are actuated together, the side components cancel out and the net force is close to or exactly vertical. When one tab or interceptor is actuated more than the other, for example when a rolling or healing force is desired, a side or yawing component is developed, causing a turning effect as well. The relative magnitude of the yawing component increases with increased dead rise angle.

BRIEF SUMMARY

Accordingly, there is a need for improved control systems and methods in marine vessels.

According to one embodiment of a method of the invention, a method for controlling a marine vessel having first and second steering nozzles and first and second trim deflectors comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors. According the this embodiment, the acts of generating the first set of actuator control signals and the second set of actuator control signals and coupling first set of actuator control signals and the second set of actuator control signals results in inducing a net minor yawing force to the marine vessel to port or to starboard by maintaining the first and second steering nozzles in a neutral position and actuating one of the first and second trim deflectors.

According to another embodiment of the method of the invention, a method for controlling a marine vessel having first and second steering nozzles and first and second trim deflectors comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors. According the this embodiment, the acts of generating the first set of actuator control signals and the second set of actuator control signals and coupling first set of actuator control signals and the second set of actuator control signals results in inducing a net yawing force to the marine vessel without inducing any substantial rolling forces to marine vessel, by actuating each of the first and second steering nozzles and one of the first and second trim deflectors.

According to another embodiment of the method of the invention, a method for controlling a marine vessel having first and second steering nozzles and first and second trim deflectors comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors. According the this embodiment, the acts of generating the first set of actuator control signals and the second set of actuator control signals and coupling first set of actuator control signals and the second set of actuator control signals results in inducing a net rolling force to the marine vessel without inducing any substantial yawing forces to the marine vessel by actuating one of the first and second steering nozzles and one of the first and second trim deflectors.

According to another embodiment of the method of the invention, a method for controlling a marine vessel having first and second steering nozzles and first and second trim deflectors comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors. According the this embodiment, the acts of generating the first set of actuator control signals and the second set of actuator control signals and coupling first set of actuator control signals and the second set of actuator control signals results in inducing a net trimming force to the marine vessel without inducing any substantial rolling or yawing forces to the marine vessel by actuating each of the first and second steering nozzles and by controlling the first and second trim deflectors.

According to another embodiment of the method of the invention, a method for controlling a marine vessel having first and second steering nozzles and first and second trim deflectors comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors. According the this embodiment, the acts of generating the first set of actuator control signals and the second set of actuator control signals and coupling first set of actuator control signals and the second set of actuator control signals results in inducing a net stabilizing force to the marine vessel without inducing any substantial trimming forces to the marine vessel by actuating each of the first and second steering nozzles and by actuating each of the first and second trim deflectors.

According to another embodiment of the method of the invention, a method for controlling a marine vessel having first and second steering nozzles and first and second trim deflectors comprises generating at least a first set of actuator control signals and a second set of actuator control signals. The first set of actuator control signals is coupled to and controls the first and second steering nozzles, and the second set of actuator control signals is coupled to and controls the first and second trim deflectors. The acts of generating the first set of actuator control signals and the second set of actuator control signals and coupling first set of actuator control signals and the second set of actuator control signals results in inducing any of a net yawing force, a net rolling force, and a net trimming force to the marine vessel without inducing any other substantial forces to the marine vessel by controlling the first and second steering nozzles and by controlling each of the first and second trim deflectors.

According to one aspect of this embodiment of the method of the invention, the method may further comprise automatically detecting parameters of the marine vessel and of any of the first and second steering nozzles and the first and second trim tabs during a maneuver of the marine vessel. According to another aspect of this embodiment of the invention, the method may further comprise modifying the act of inducing any of the net yawing force, the net rolling force, and the net trimming force to the marine vessel to account for the detected parameters.

According to one embodiment of a system of the invention, a system for controlling a marine vessel having first and second steering nozzles and first and second trim deflectors, comprises a processor that is configured to provide a first set of actuator control signals and a second set of actuator control signals, and wherein the first set of actuator control signals are coupled to and control the first and second steering nozzles and the second set of actuator control signals are coupled to and control the first and second trim deflectors. According the this embodiment, the processor is configured to provide the first set of actuator control signals and the second set of actuator control signal so that for minor yaw movements of the vessel to port or to starboard, the first and second steering nozzles are maintained in a neutral position and one of the first and second trim deflectors is actuated.

According to another embodiment of a system of the invention, a system for controlling a marine vessel having first and second steering nozzles and first and second trim deflectors, comprises a processor that is configured to provide a first set of actuator control signals and a second set of actuator control signals, and wherein the first set of actuator control signals are coupled to and control the first and second steering nozzles and the second set of actuator control signals are coupled to and control the first and second trim deflectors. According the this embodiment, the processor is configured to provide the first set of actuator control signals and the second set of actuator control signal so that a net yawing force is induced to the marine vessel without inducing any substantial rolling forces to marine vessel, by actuating each of the first and second steering nozzles and one of the first and second trim deflectors.

According to another embodiment of a system of the invention, a system for controlling a marine vessel having first and second steering nozzles and first and second trim deflectors, comprises a processor that is configured to provide a first set of actuator control signals and a second set of actuator control signals, and wherein the first set of actuator control signals are coupled to and control the first and second steering nozzles and the second set of actuator control signals are coupled to and control the first and second trim deflectors. According the this embodiment, the processor is configured to provide the first set of actuator control signals and the second set of actuator control signal to induce a net rolling force to the vessel without inducing any substantial yawing forces to the marine vessel, by actuating one of the first and second steering nozzles and by actuating one of the first and second trim deflectors.

According to another embodiment of a system of the invention, a system for controlling a marine vessel having first and second steering nozzles and first and second trim deflectors, comprises a processor that is configured to provide a first set of actuator control signals and a second set of actuator control signals, and wherein the first set of actuator control signals are coupled to and control the first and second steering nozzles and the second set of actuator control signals are coupled to and control the first and second trim deflectors. According the this embodiment, the processor is configured to provide the first set of actuator control signals and the second set of actuator control signal to induce a net trimming force to the marine vessel without inducing any substantial rolling or yawing forces to the marine vessel by actuating each of the first and second steering nozzles and by controlling the first and second trim deflectors.

According to another embodiment of a system of the invention, a system for controlling a marine vessel having first and second steering nozzles and first and second trim deflectors, comprises a processor that is configured to provide a first set of actuator control signals and a second set of actuator control signals, and wherein the first set of actuator control signals are coupled to and control the first and second steering nozzles and the second set of actuator control signals are coupled to and control the first and second trim deflectors. According the this embodiment, the processor is configured to provide the first set of actuator control signals and the second set of actuator control signal to induce a net stabilizing force to the marine vessel without inducing any substantial trimming forces to the marine vessel by actuating each of the first and second steering nozzles and by actuating each of the first and second trim deflectors.

According to another embodiment of a system of the invention, a system for controlling a marine vessel having first and second steering nozzles and first and second trim deflectors, comprises a processor that is configured to provide a first set of actuator control signals and a second set of actuator control signals. The first set of actuator control signals are coupled to and control the first and second steering nozzles and the second set of actuator control signals are coupled to and control the first and second trim deflectors. The processor is configured to provide the first set of actuator control signals and the second set of actuator control signal to induce any of a net yawing force, a net rolling force, and a net trimming force to the marine vessel without inducing any other substantial forces to the marine vessel by controlling the first and second steering nozzles and by controlling the first and second trim deflectors.

According to one aspect of this embodiment of the system of the invention, the system may further comprise at least one detector that automatically detects parameters of the marine vessel and of any of the first and second steering nozzles and the first and second trim tabs during a maneuver of the marine vessel. According to another aspect of this embodiment of the system of the invention, the system may further comprise an active control module that modifies any of the net yawing force, the net rolling force, and the net trimming force to the marine vessel to account for the detected parameters.

BRIEF DESCRIPTION OF DRAWINGS

The foregoing and other advantages of the application will be more fully appreciated with reference to the following drawings in which:

FIGS. 2a and 2c illustrate an exemplary vessel comprising dual waterjet nozzles and dual trim deflectors, with no trimming or yawing force induced to the vessel;

FIGS. 2b and 2d illustrate an exemplary vessel comprising dual waterjet nozzles and dual trim deflectors, with a bow down trimming force induced to the vessel;

FIG. 3a illustrates an exemplary vessel comprising a dual waterjet nozzles and dual trim deflectors, with enhanced stability characteristics due to the configuration of the nozzles and trim deflectors;

FIG. 3b illustrates an exemplary vessel comprising a dual waterjet nozzles and dual trim deflectors, with a restoring force induced to the vessel under the influence of an external influence on the vessel;

FIGS. 4a and 4d illustrate an exemplary vessel comprising dual waterjet nozzles and dual trim deflectors, with a turning to port force induced to the vessel with the waterjet nozzles;

FIGS. 4b and 4e illustrate an exemplary vessel comprising dual waterjet nozzles and dual trim deflectors, with a turning to port force induced to the vessel with the trim deflectors;

FIG. 5A illustrates an exemplary control system diagram for a vessel comprising dual waterjet nozzles, dual reversing buckets, and dual trim deflectors;

FIG. 5B illustrates another embodiment of an exemplary control system diagram for a vessel comprising dual waterjet nozzles, dual reversing buckets, and dual trim deflectors;

DETAILED DESCRIPTION

Accordingly, there is a need for a device to counter or mitigate outside yawing disturbances on waterjet driven craft such that an operator is not required to repeatedly compensate manually with helm adjustments, without placing appendages in the water that will slow the craft down at high speeds or prevent the craft from operating is shallow water. Also, there is a need for a device that will allow a waterjet craft to develop downward trimming forces at the transom while moving forward in order to lift the bow under certain sea conditions. There is also a need to decouple the forces developed by the waterjets and trimming devices such that yawing, trimming and rolling forces can be applied individually and in combination without developing producing any unwanted motions or forces.

The system disclosed herein has several aspects. One aspect is the system is configured to individually control, for example, the angles of deflection of the waterjet nozzles while moving forward (at all speeds) for the purpose of increasing directional stability and applying a downward force to the craft at the transom for trimming the bow up. Individual control of waterjet nozzle angles while maneuvering at slow speeds is a relatively common practice. However, it is standard practice to control the nozzles in unison when moving forward at medium to high speeds. This is because the maximum yawing force in a twin jet boat is achieved when both nozzles are deflected fully.

Figure 1A:
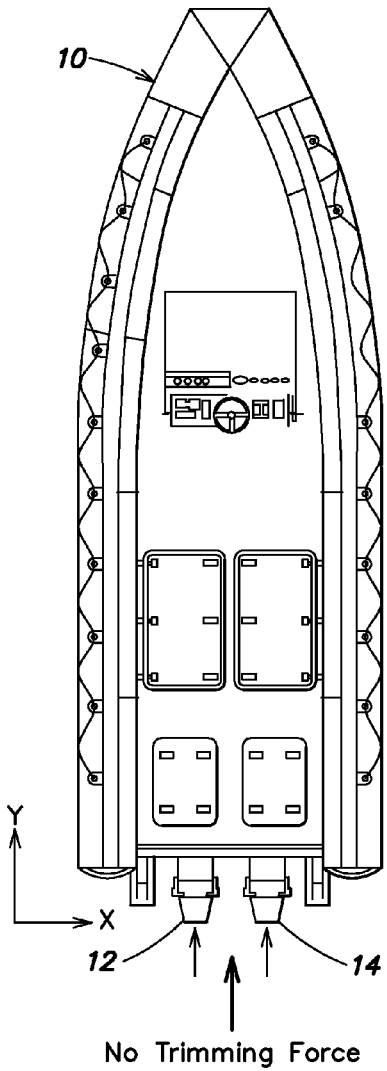
FIGS. 1a and 1c illustrate an exemplary vessel comprising dual waterjet nozzles and dual trim deflectors, with no trimming or yawing force induced to the vessel.
Figure 1B:
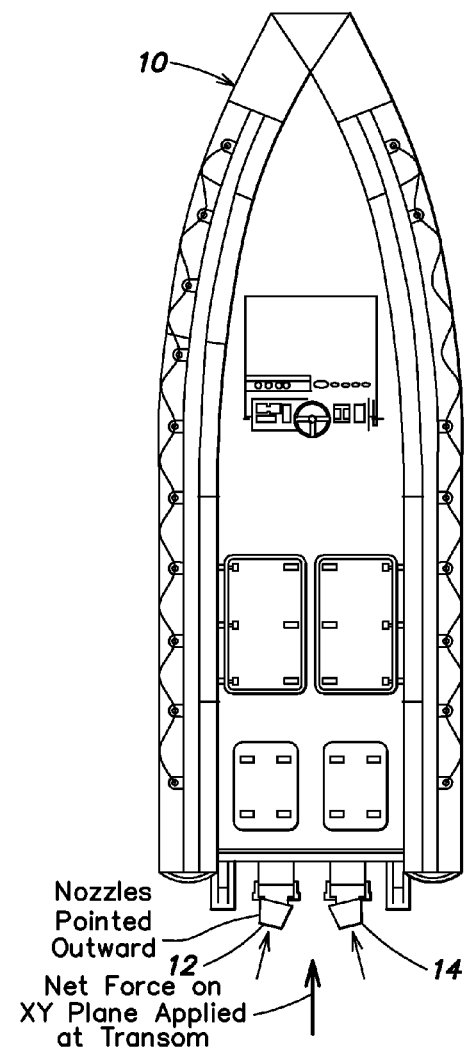
FIGS. 1b and 1d illustrate an exemplary vessel comprising dual waterjet nozzles and dual trim deflectors, with a bow up trimming force induced to the vessel.
Figure 1C:
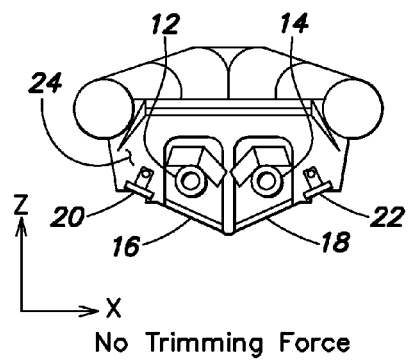
Figure 1D:
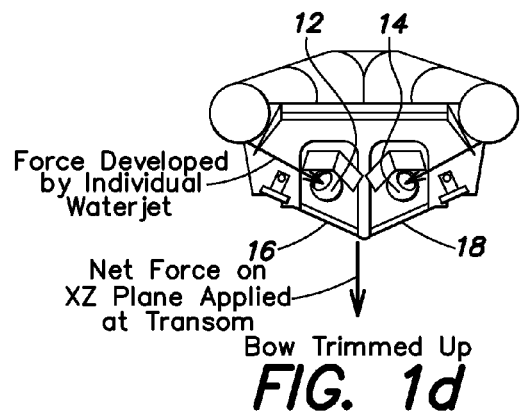

FIGS. 1a and 1c illustrate the net forces in both the X-Y plane, or horizontal plane, and the X-Z plane, or vertical plane (as illustrated in the Figure), with waterjet nozzles 12, 14 in a neutral position. As can be seen, with the waterjets in the neutral position, there is no downward force, in the X-Z plane provided to the vessel 10. According to one aspect of an embodiment of the invention, as shown in FIGS. 1b and 1d, in a craft 10 equipped with waterjets 12, 14 that have a nozzle rotational axis perpendicular to the bottom of the boat 16, 18 and a non-zero dead rise angle of the hull (e.g. a V-shaped or deep V-shaped hull), the steering nozzles 12, 14 can be controlled so as to be symmetrically pointed outwards (see FIG. 1b) to create a net downward force in the X-Z plane to the vessel 10 at the rear of the craft, thereby also trimming the bow of the vessel up. The magnitude of this force applied to the stern of the vessel is proportional to the magnitude of steering nozzle deflection and also to the thrust provided by the jets. If the thrust magnitudes provided by the nozzles 12, 14 are equal and the steering nozzle deflections are equal, any yawing force developed will be negligible.

FIGS. 2a and 2c illustrate the net forces in both the X-Y plane, or horizontal plane, and the X-Z plane, or vertical plane (as illustrated in the Figure), with trim tabs 20, 22 in a neutral (non-actuated) position. As illustrated, there is no vertical force in the X-Z plane provided to the vessel with the trim tabs in the neutral position. According to one aspect of an embodiment of the invention, as shown in FIGS. 2b and 2d, the bow can be trimmed down (the stern can be forced up) in the X-Z plane by straightening the nozzles 12, 14 (keeping them in a neutral position) and by lowering the trim tabs 20, 22.

Figure 3C:
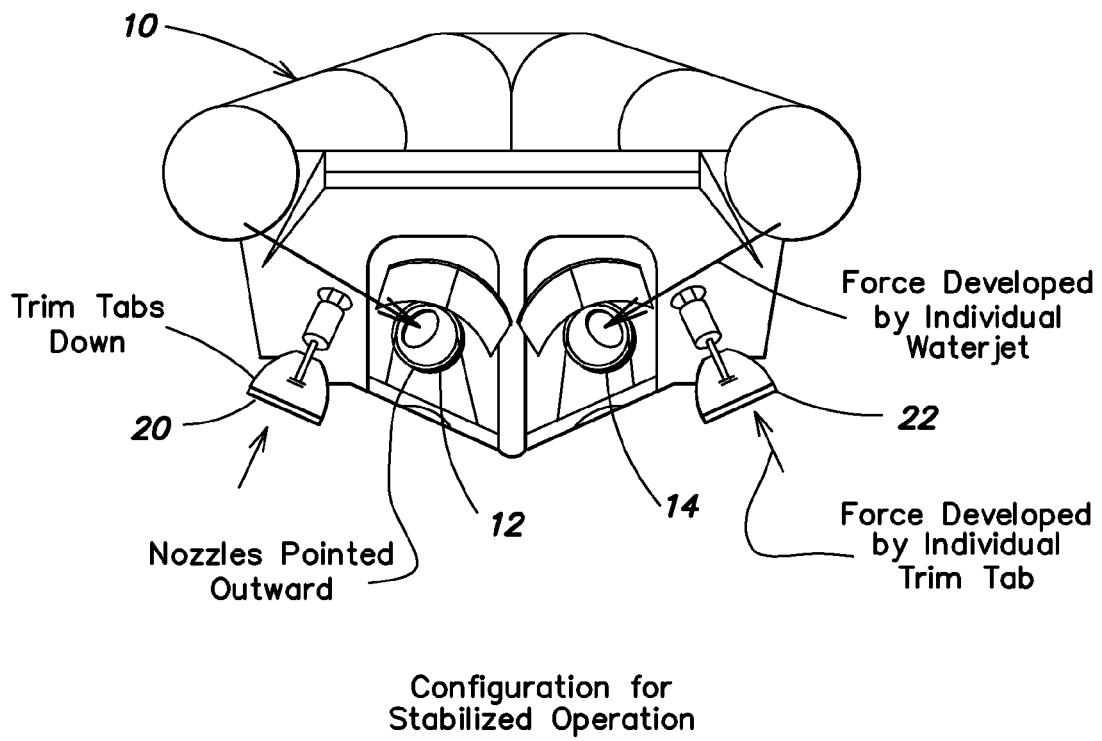
FIG. 3c illustrates an exemplary vessel comprising a dual waterjet nozzles and dual trim deflectors, with enhanced stability characteristics due to the outward pointing nozzles and lowered trim deflectors.

According to one aspect of an embodiment the invention, by combining these features as illustrated for example in FIG. 3a with the vessel under no external influence, and FIG. 3b with the vessel under an external influence, in particular an embodiment of the control system can be configured to provide for pointing the nozzles 12, 14 outward and to also provide for lowering the trim tabs 20, 22, together to improve the directional stability of the vessel 10, as is illustrated in FIGS. 3a & 3c. In particular, one advantage of this embodiment is that even if no net trimming forces are desired to be provided to the vessel 10, the nozzles and trim tabs can still be positioned (e.g., FIG. 3c) such that even though no net trimming force is developed (i.e., the individual trimming forces are equal), directional stability characteristics are provided to the vessel.

In addition, an advantage of an embodiment of the invention features is illustrated for example in FIG. 3b with the vessel under an external influence, which is that a condition is created whereby a restoring force is developed in response to an external directional disturbance. As shown in FIG. 3b, the trim tab 22 that is located opposite the direction of the bow movement as a result of the external directional force (for example the starboard side nozzle if the bow moves to port) encounters an increase in force acting on the trim tab due to an increase in velocity and angle of attack, which results in a lifting force on the vessel that increases and opposes the external disturbance. Conversely, the trim tab 20 on the same side as the bow movement experiences a decrease in velocity and angle of attack, such that the lifting force on the vessel that would otherwise be in the same direction of the disturbance decreases. The net result is a force developed by the trim tabs that opposes the external disturbance. Also referring to FIG. 3b, the waterjets also develop a corrective force in response to an external directional disturbance. In particular, this corrective force in the waterjets is a result of an impedance of water flow into the waterjet 12 on the same side of the bow movement resulting from the external influence, thereby resulting in a lower waterjet force acting in the direction of the disturbance, and thereby creating a differential force resulting from the combination of the waterjet 12 and the waterjet 14 on the opposite side that opposes the external disturbance.

Yet another advantage of this embodiment is the increase in yawing force sensitivity to nozzle displacements around the neutral position (nozzles positioned symmetrically). This is because steering nozzles are often somewhat larger in diameter than the diameter of the jet of water that passes through the nozzle.

Figure 6:
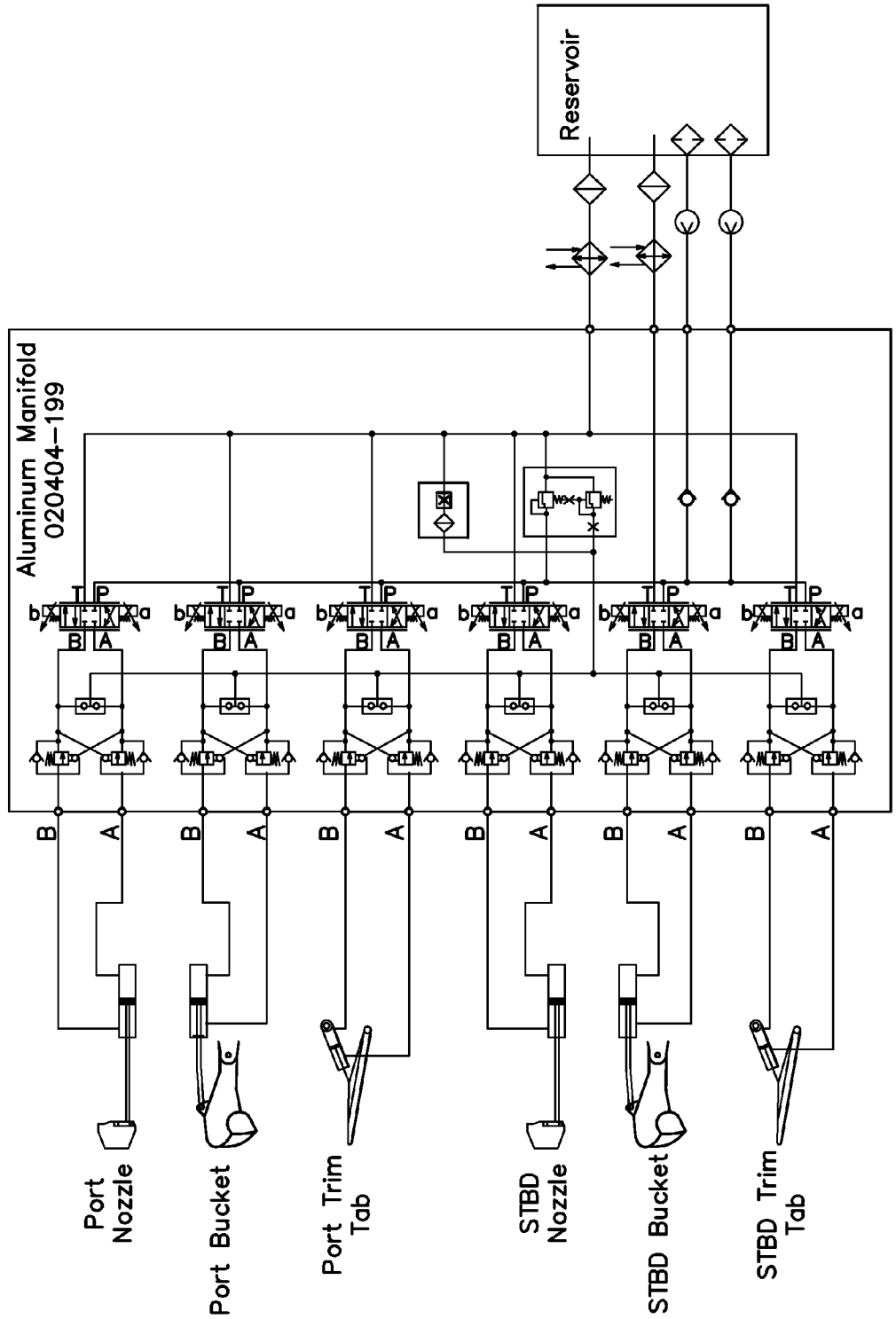
FIG. 6 illustrates an exemplary hydraulic schematic diagram for a vessel comprising dual waterjet nozzles and dual trim deflectors.

Referring to FIGS. 5 and 6, there is illustrated an exemplary system diagram and hydraulic schematic, respectively, of a control system that can be used to control a vessel including the waterjets 12, 14 and the trim tabs 20, 22, along with other aspects of the vessel. Such a system, except for the aspect of controlling the trim tabs, is described in commonly owned U.S. patent application Ser. No. 10/891,873, which was filed on Jul. 15, 2004, and which is hereby incorporated by reference herein in its entirety. Referring to FIG. 5A, the system diagram illustrates a control system for a marine vessel having two waterjets nozzles, 558P and 558S, two reversing buckets, 552P and 552S, and two trim deflectors, 554P and 554S. It is to be appreciated as is disclosed throughout this application that the control processor unit 530 generates output actuator control signals based on the input vessel control signals received, for example, from vessel control apparatus 500 and 520. Specifically, the operation of a vessel having two or more waterjet nozzles, reversing buckets, and trim deflectors is accomplished with one or more control modules stored, for example, within control processor unit 530, for calculating or generating the output actuator control signals provided by the control processor unit 530. As will be appreciated from the following description, such control modules can take into account the design of the vessel, and the number and arrangement of the control surfaces and propulsion apparatus.

Control of a marine vessel having two waterjets nozzles, 558P and 558S, two reversing buckets, 552P and 552S, and two trim deflectors, 554P and 554S can be accomplished, for example, with a vessel control stick 500 (joystick) and a steering tiller 520, which could also be a helm controller (steering wheel), connected to provide vessel control signals to a 24 volts DC control processor unit 530 (control box). The vessel control unit 530 provides actuator control signals to a number of devices and actuators and receives feedback and sensor signals from a number of actuators and devices. FIG. 5 only illustrates a few such actuators and devices, with the understanding that complete control of a marine vessel is a complex procedure that can involve any number of control apparatus (not illustrated) and depends on a number of operating conditions and design factors. Note that FIG. 5 is an exemplary system diagram, and as such, some lines are shown joined to indicate that they share a common cable, in this embodiment, and not to indicate that they are branched or carry the same signals.

A set of output signals from the control processor unit 530 is provided to port and starboard reversing bucket proportional solenoid valves 540P and 540S. The bucket proportional solenoid valves have coils, indicated by "a" and "b" that control the hydraulic valve ports to move fluid through respective hydraulic lines to and from respective reversing bucket actuator 553P and 553S. The reversing bucket actuators 553P and 553S can retract or extend to move the reversing buckets up or down to appropriately redirect the waterjet stream and provide forward or reversing thrust.

Another output of the control processor unit 530 is provided to the nozzle proportional valves 550P and 550S. The nozzle proportional valves have coils, indicated by "a" and "b" that control the hydraulic valve ports to move fluid through hydraulic lines to and from nozzle actuators 551P and 551S. The nozzle actuators can retract or extend to move the nozzles 558P and 558S from side to side control the waterjet stream and provide a turning force.

Another output of the control processor unit 530 is provided to the nozzle proportional valves 560P and 560S. The nozzle proportional valves have coils, indicated by "a" and "b" that control the hydraulic valve ports to move fluid through hydraulic lines to and from nozzle actuators 555P and 555S. The nozzle actuators can retract or extend to move the trim deflectors 554P and 554S to provide a trimming force to the vessel.

Additionally, an output of the control processor unit 530 provides actuator control signals to control a port and starboard prime mover, or engines 502P and 502S. An actuator may be any device or element able to actuate or set an actuated device. Here the engine's rotation speed (RPM) or another aspect of engine power or throughput may be so controlled using a throttle device, which may comprise any of a mechanical, e.g. hydraulic, pneumatic, or electrical device, or combinations thereof.

According to an aspect of some embodiments of the control system of FIG. 5A, an autopilot interface 538, as known to those skilled in the art, can receive and provide a vessel control signal to the control processor unit 530, which can be used to determine the herein described actuator control signals. For example, the autopilot interface 538 can be used to maintain a heading or a speed. It is to be appreciated, however, that the autopilot interface 538 can also be integrated with the control processor unit 530 and that the control processor unit 530 can also be programmed to comprise the autopilot 538.

FIG. 5B illustrates another embodiment of a control system for a marine vessel having two waterjets nozzles, 558P and 558S, two reversing buckets, 552P and 552S, and two trim deflectors, 554P and 554S, wherein manual control by a user of the system in combination with the system can be accomplished, for example, with a vessel control stick 510 (joystick) for controlling movement of the vessel in the forward and reverse axis and port and starboard axis, and a steering helm 512 for controlling movement along a rotational axis, which are connected to provide vessel control signals to the control processor unit 530 (control box). Such as system, which provides intuitive control of the vessel to provide forces to vessel in substantially the same direction of the combination of the control stick 510 and the helm 512 is described in commonly owned U.S. patent application Ser. No. 10/891, 873, which was filed on Jul. 15, 2004, and which is hereby incorporated by reference herein in its entirety. In addition, a trim and roll control panel 514, including trim knob 516 and roll knob 518 can be used to control the trim and roll forces induced to the vessel according to the various embodiments of the control system as described herein. It is to be appreciated that like elements of the control system of FIG. 5A and FIG. 5B are labeled with like reference number and that any description of these elements is not repeated for the sake of brevity.

It is to be appreciated the trim tabs 20, 22 (and the steering nozzles 12, 14) can be also controlled automatically to accomplish the resultant movements of the steering nozzles and trim tabs, either alone or in combination, as disclosed herein.

Figure 4C:
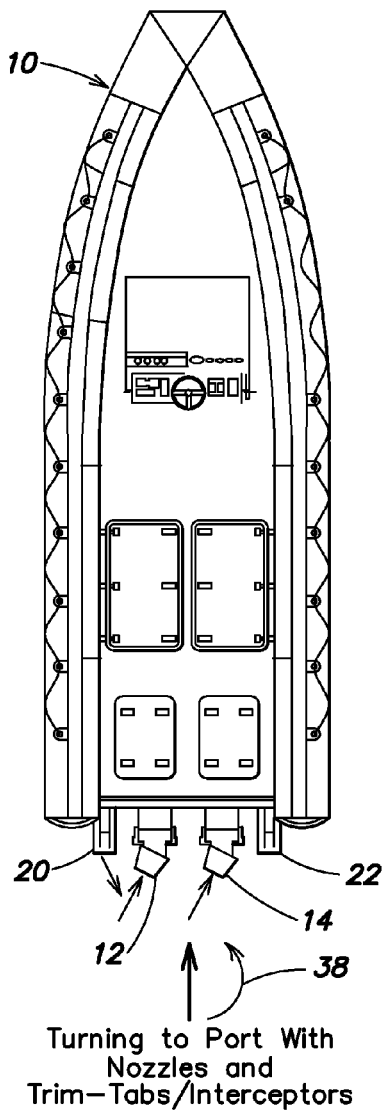
FIGS. 4c and 4f illustrate an exemplary vessel comprising dual waterjet nozzles and dual trim deflectors, with a turning to port force and with little or no rolling force induced to the vessel with the waterjet nozzles and the trim deflectors.

Another aspect of an embodiment of the invention disclosed herein is the ability to control the trim tabs or interceptors 20, 22 in conjunction with the steering nozzles 12, 14 to provide rolling, trimming and yawing forces on the vessel, either alone or in combination. For example, as shown in FIGS. 4a and 4d, turning the craft 10 with the waterjet nozzles 12, 14 alone can create a significant rolling force 30 (e.g., counterclockwise when turning the nozzles to port) in addition to the yawing force 32 required. Also, as shown in FIGS. 4b and 4e, turning the vessel 10 with trim tabs or interceptors 20, 22 alone will create a relatively small turning force 34, as compared to an entire range of available turning force, and a significant rolling force 36 (e.g. a clockwise rolling force when extending the port trim tab). According to one aspect of the invention, the forces created by the steering nozzles which produce the counterclockwise rolling force, can be offset by the forces created by the trim tabs which produce the clockwise rolling force in the opposite direction (See FIG. 4e) of the rolling force 30 created by the steering nozzles alone (as illustrated in FIG. 4d). According to this aspect of the invention, by combining the control of the trim tabs/interceptors 20, 22 and the steering nozzles 12, 14 as discussed above, so as to, for example, actuate the trim tab 20 while not actuating the trim tab 22 (e.g. actuating one trim tab 20 outward) and so as to rotate the steering nozzles in unison as is illustrated in combination in FIGS. 4c and 4f, results in a desired turning force 40 with any rolling effect to the vessel mitigated and substantially eliminated. Also, it should be appreciated that another advantage of this aspect of the invention is that minimizing or eliminating the steering nozzle deflection in a turn of the vessel will reduce the speed loss, as nozzle deflection has an adverse effect on waterjet efficiency. It is to be appreciated that the movements of steering nozzles and trim tabs as illustrated in FIGS. 4a-4f are by way of example only to illustrate how the steering nozzles and trim tabs can be moved in combination to effect a net yaw force, e.g. in the port direction on the vessel 10 with a controlled rolling effect, and that other net yawing forces such as force in port direction with a controlled rolling effect on the vessel can also be created by the appropriate actuation of the combination of the steering nozzles and trim deflectors or interceptors.

Figure 4G:
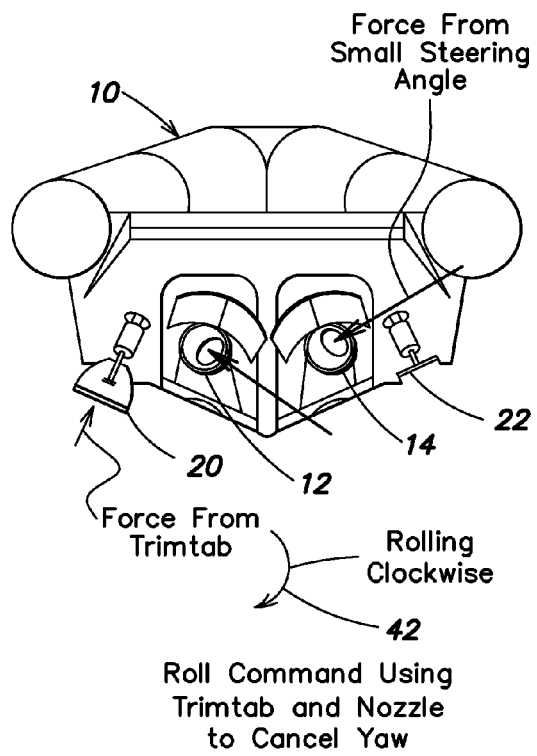
FIG. 4g illustrates an exemplary vessel comprising dual waterjet nozzles and dual trim deflectors, with a net rolling force and with little or substantially no yawing forces induced to the vessel with the waterjet nozzles and the trim deflectors.

Referring to another embodiment as illustrated in FIG. 4g, there is illustrated another aspect of the invention that can induce a rolling movement to the craft 10 and/or substantially eliminate unwanted yawing forces induced to the vessel. With this arrangement select trim tabs and steering nozzles are activated to provide a desired rolling effect. For example, the port steering nozzle 12 and starboard steering nozzle 14 can be deflected to starboard, at least slightly to cancel any unwanted yaw force 34 created by the trim tab 20 being activated (with the trim tab 22 either not activated or only slightly activated so that there is a difference in activation between the trim tabs 20, 22), so as to induce a desired rolling force 42, e.g. in the clockwise direction, to the vessel. It is to be appreciated that the movements of steering nozzles and trim tabs as illustrated in FIG. 4g are by way of example only to illustrate how the steering nozzles and trim tabs can be moved in combination to effect a net rolling force on the vessel 10 with little or substantially no yawing forces, and that other forces such as a rolling force on the vessel in counter clockwise direction 10 with little or substantially no yawing can also be created by the appropriate actuation of the combination of the steering nozzles and trim deflectors or interceptors.

Figure 7:
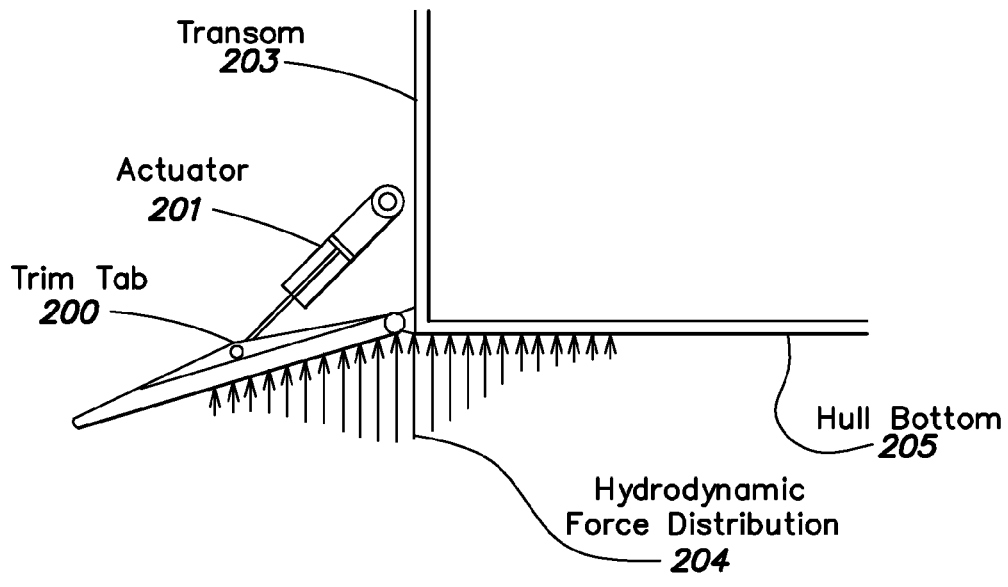
FIG. 7 illustrates an exemplary embodiment of a trim tab mounted to a transom of a vessel.
Figure 8:
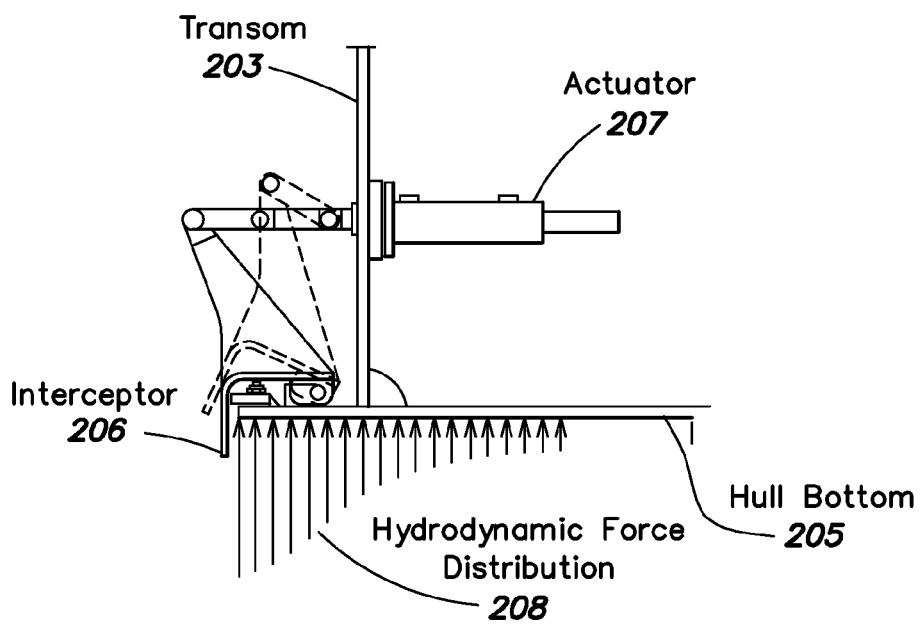
FIG. 8 illustrates an exemplary embodiment of a trim interceptor mounted to a transom of a vessel.

Given the ability to control the actuation of the steering nozzles and trim tabs so as to decouple rolling, yawing and trimming forces that are applied to a planing craft, it is desirable according to one aspect of the invention to provide separate or integrated control inputs interfaced to a controller that can be used for commanding the trim, roll and yaw forces that are to be applied to craft by the waterjets and trim deflectors. It is to be appreciated that according to this disclosure a trim deflector can be any of trim tabs as illustrated, for example, in FIG. 7, and interceptor as illustrated, for example, in FIG. 8 or any other transom mounted device used by those of skill in the art to develop lifting forces on a craft for trimming Referring to FIGS. 9-10, there is illustrated an exemplary two-axis trim/roll control device 102 that can be, for example, mounted to a control joystick 101 such that it can be manipulated using ones thumb or mounted, for example, separately on the arm of a chair or console. Operation of the device 102 of FIG. 10 by a user, which is comprised of four switches that are integrated into one two-axis device, as integrated with a controller according to an embodiment of the invention can be, by way example, as follows: when the device is pushed upward 250, the device signals a desired increase in bow trim to the controller. As long as the device is pushed upward, the controller, as described infra, will control the combination of the steering nozzles and trim tabs or interceptors to trim the bow up provided that there is sufficient movement (stroke) available in the trim tabs and/or nozzles. Similarly, if the device 102 is pushed to the right 252, the device provides a signal to the controller, as described infra, which will control the combination of the steering nozzles and trim tabs or interceptors so that the craft will roll to starboard. As long as the device is pushed to the right, the craft will continue to roll to starboard provided that there is sufficient movement (stroke) available in the trim tabs and/or nozzles. Trimming the bow down and rolling to the vessel to port can be accomplished with similar but opposite motions down 254 and left 256 with the device, so that the device provides a signal to the controller, as described infra, which controls the combination of the steering nozzles and trim tabs or interceptors so that the craft will effect such movements.

Figure 9B:
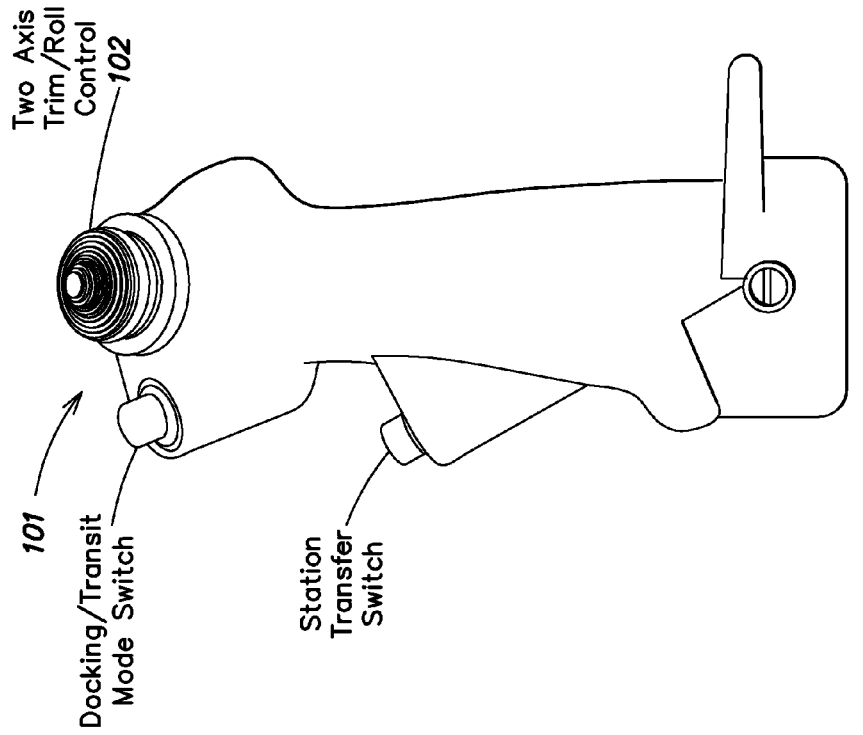
FIG. 9 illustrates an exemplary embodiment of a two-axis control device for controlling trim and roll of a vessel.
Figure 9A:
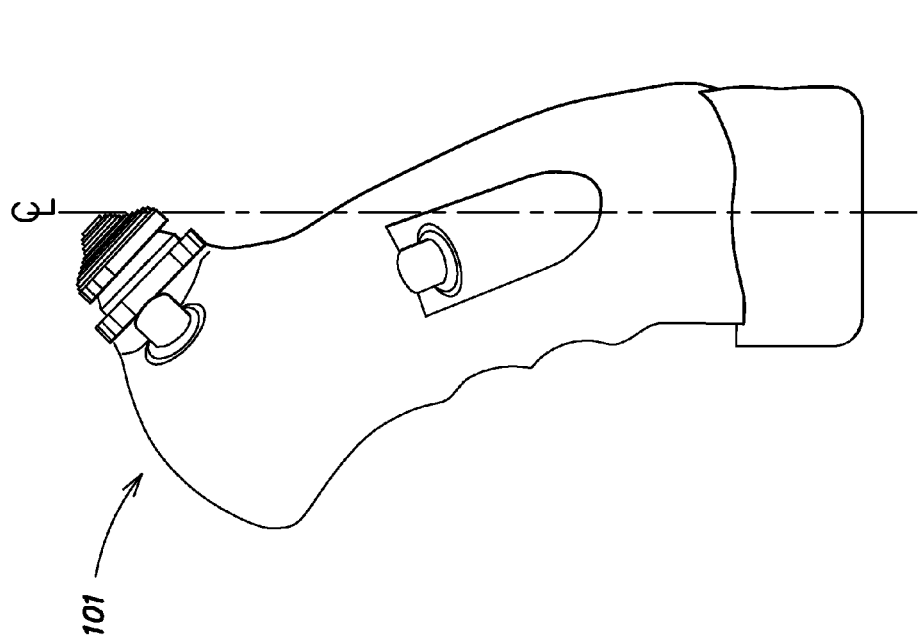
Figure 10:
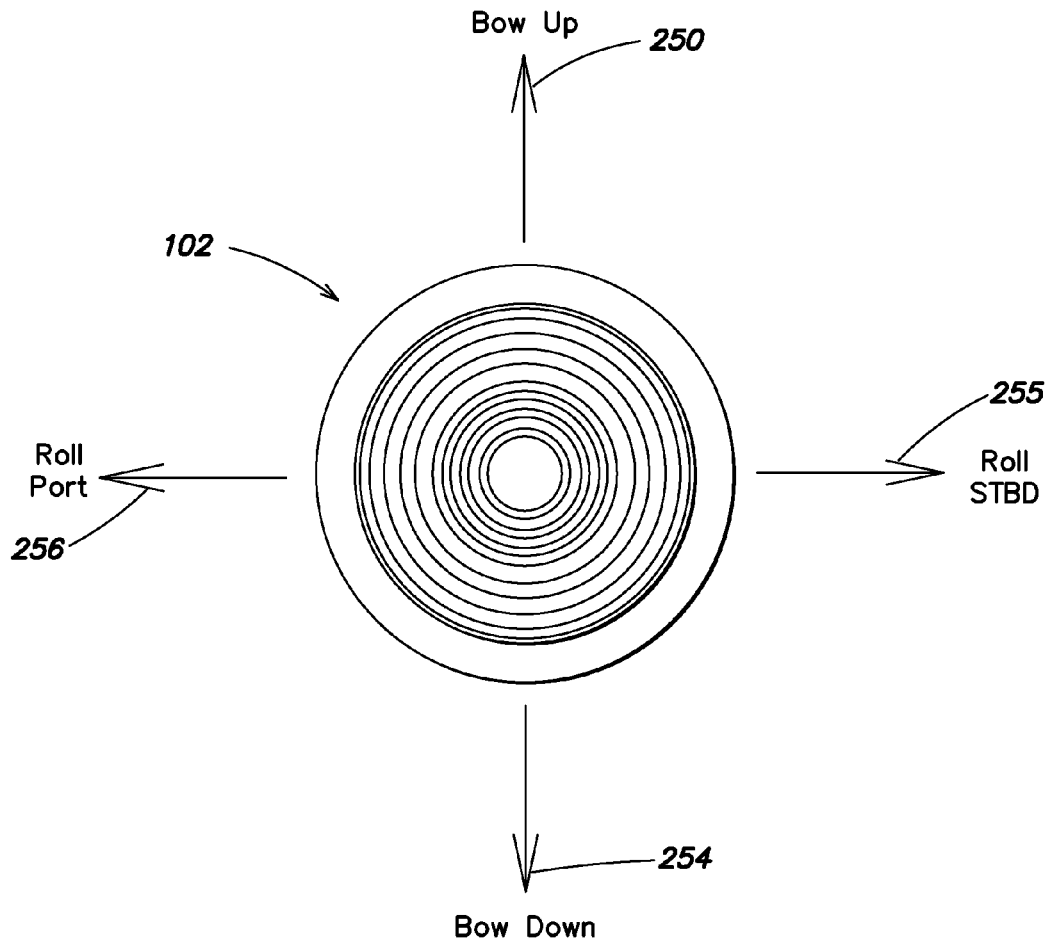
FIG. 10 illustrates an exploded view of the two-axis controller of FIG. 9.

It is to be appreciated that the two-axis trim/roll control device 102 shown in FIGS. 9 and 10 is one of many types of control devices as known in the art that an operator can use to command different levels of trim and rolling forces to be applied to the craft, and that according to one aspect of the invention any control stick that allows these command movements by an operator can be used with the controller of the invention. For example, although the two-axis device 102 shown in FIGS. 9 & 10 is comprised of switches, other trim/roll controllers can utilize variable output transducers or potentiometers. Other trim/roll controls can use individual devices for roll and trim or four separate devices for Bow Up, Bow Down, Roll Port and Roll Starboard, for example, four switches arranged in a diamond pattern.

Similar to the trim/roll controls, yaw forces can be commanded using a separate device such as a helm 103 (See FIG. 11) or a tiller in combination with a controller of the invention. In most cases, turning of the helm will correspond to commanded yawing forces. However, in many high speed craft, it is desirable to also induce an rolling moment while turning. Some problems with high-speed craft that do not roll properly in a high-speed turn are, for example, slipping in the water and spinning-out. Also a craft that is unstable may roll outboard in a turn if there is too little induced roll or loose sight of the horizon in a turn if there is too much induced roll. It is appreciated that an optimum amount of rolling moment while turning to be commanded by the controller depends on several factors such as hull shape, weight distribution, desired turning radius and speed of the vessel. Too much or too little roll may make the craft difficult to control in a turn or uncomfortable for the passengers. Accordingly, in many cases, it is advantages according to one aspect of the invention to calculate and induce a certain amount of roll in a turn using an algorithm 169 such as the one shown in FIGS. 16A and 16C. Further description of an embodiment of a control system of the invention including a turning control module will be described in detail with reference to FIGS. 16A and 16C.

Figure 11:
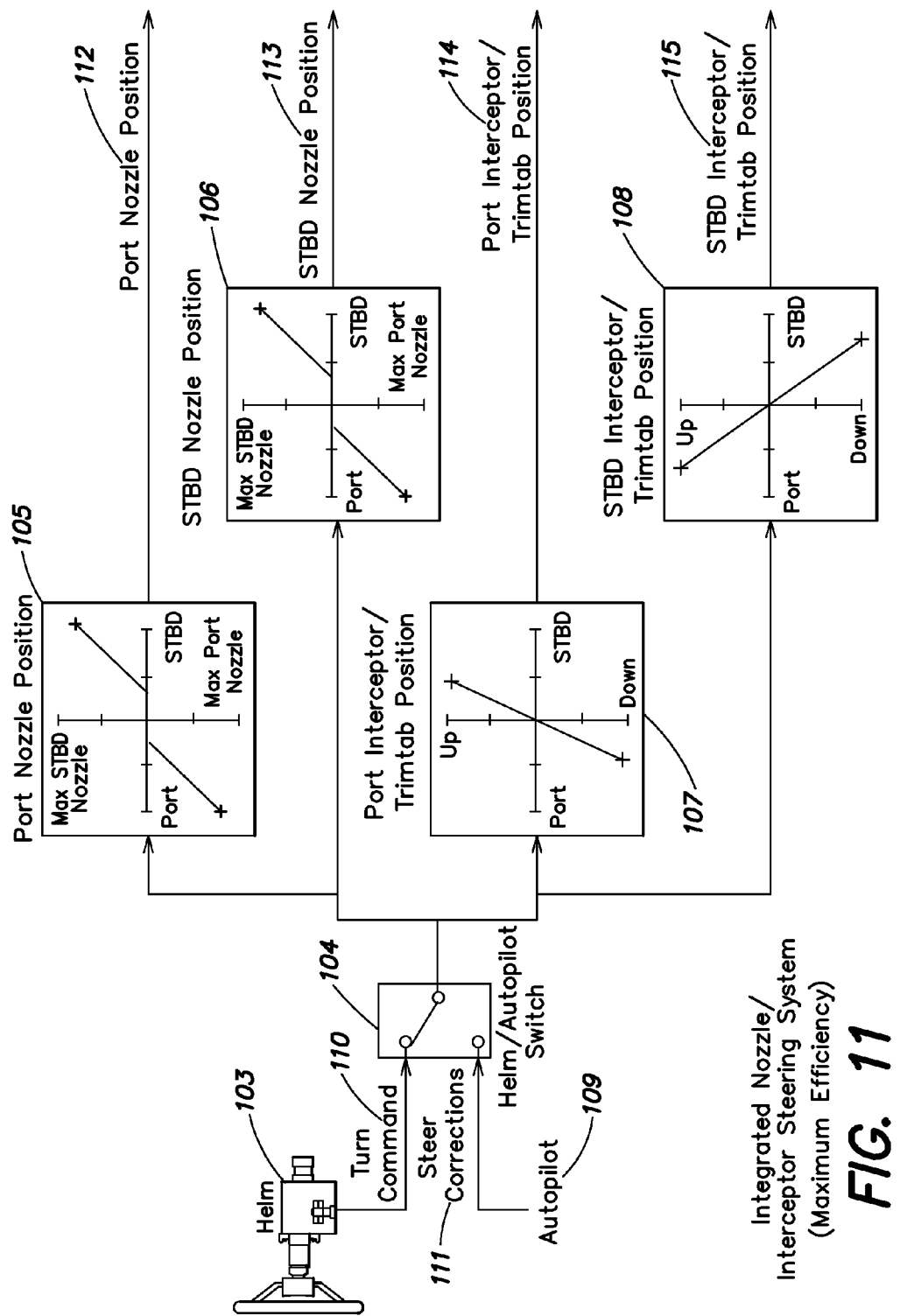
FIG. 11 illustrates one embodiment of a control system for controlling a vessel comprising dual waterjet nozzles and dual trim deflectors, with improved propulsive efficiency under certain conditions.

It is appreciated according to some embodiments of the invention that due to the adverse effect of backpressure on the water flow through the waterjet, it is considerably more efficient to develop steering forces for small steering corrections of a vessel using trim tabs or interceptors in lieu of waterjet nozzles. For example, it is appreciated according to some embodiments of the invention that when making small corrections such as those desired to maintain a steady course or to counter wind disturbances, a sufficient amount of yawing force can be developed with the trim tabs or interceptors and it is typically not necessary to actuate the steering nozzles to develop additional yawing force or to counter the rolling effects of the trim deflectors. Some advantages of this embodiment are that considerable increases in overall speed or decreases in fuel consumption can be realized when operating this way. An exemplary algorithm for controlling movement of a vessel to provide for such corrections is shown in FIG. 11, where a helm/autopilot switch function module 104 can be switched between two states to determine whether the vessel steering is controlled by the helm 103 or by an autopilot 109. The steering signal that is active (switched on) is fed through the switch function module 104 and provided to the input of four position function modules. It is to be appreciated the function modules 105-108 as illustrated in FIG. 11 can be, for example, separate control modules in an overall control device, and can be implemented for example in software, in hardware or in a combination of software and hardware. It is also to be appreciated that variations apparent to one of skill in the art, such as for example, an integrated control routine implemented on a processor are also with the scope of the invention.

Referring to FIG. 11, Port and Starboard Nozzle Position modules 105, 106 both have significant deadband regions where the nozzles are not actuated in response to small steering commands provided by the switch 104. As described above, this is to minimize the waterjet disturbance and maximize the propulsive efficiency. The same steering command signal is also fed into the port and starboard Interceptor/Trimtab Position function modules 107, 108 where small steering corrections correspond to significant movements of the trimtabs or interceptors. By way of example, the turning-to-port maneuver illustrated in FIGS. 4b and 4e is an exemplary movement that can be effected by these modules, as the desired turning force is relatively small. Consider a steering correction to port commanded by the helm or autopilot that is less than ⅓ of the maximum turning command to port. The Port and Starboard function modules 105, 106 both continue to output a straight ahead or neutral nozzle command 112, 113 to the respective port and starboard actuators and nozzles, the Port Interceptor/Trimtab function module 107 outputs a substantial down command 114 to the port trim-tab 20 (see FIGS. 4b and 4e) and actuator combination, and the STBD Interceptor/Trimtab function module 108 outputs a significant up command 115 to the starboard trimtab 22 (see FIGS. 4b and 4e) and actuator combination, where maximum up is considered at least slightly above the waterline. Accordingly, one advantage of this embodiment of the invention is that for small relatively minor course corrections such as, for example, the ones that would be desired to maintain a steady course, the roll component developed by the trimtabs or interceptors is relatively small and has little effect on the operation of the craft or passenger comfort. Of course, it is to be appreciated that the movements of steering nozzles and trim tabs as illustrated in FIGS. 4b-4e in response to the embodiment of the controller of FIG. 11 are by way of example only to illustrate how the trim tabs can be moved in combination to effect a net yaw force in the port directions and that other net yawing forces such as force in starboard direction on the vessel can also be created by the appropriate actuation of the combination of trim deflectors or interceptors.

Figure 12:
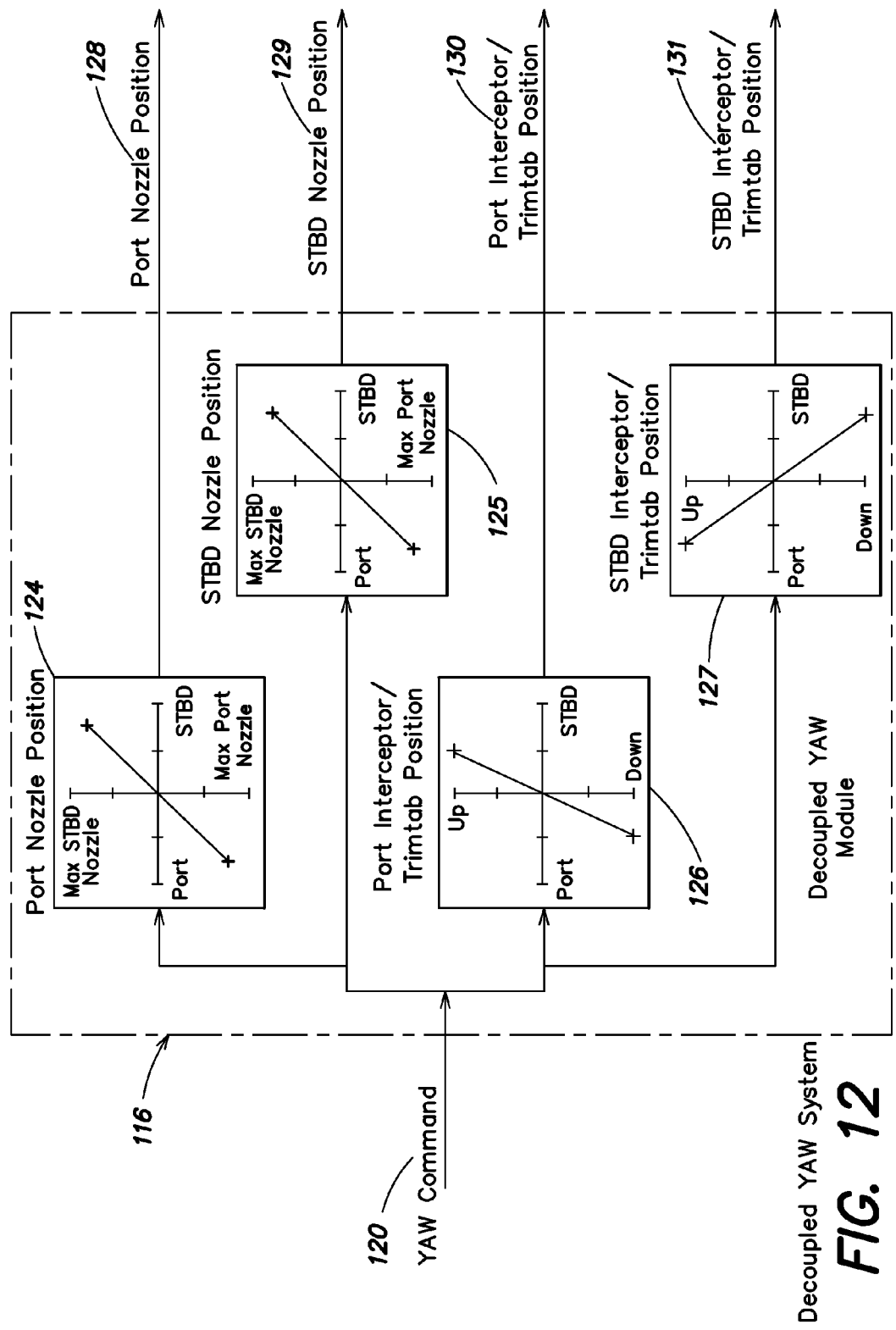
FIG. 12 illustrates an exemplary decoupled yaw control function module and corresponding signals for a vessel comprising dual waterjet nozzles and dual trim deflectors.
Figure 13:
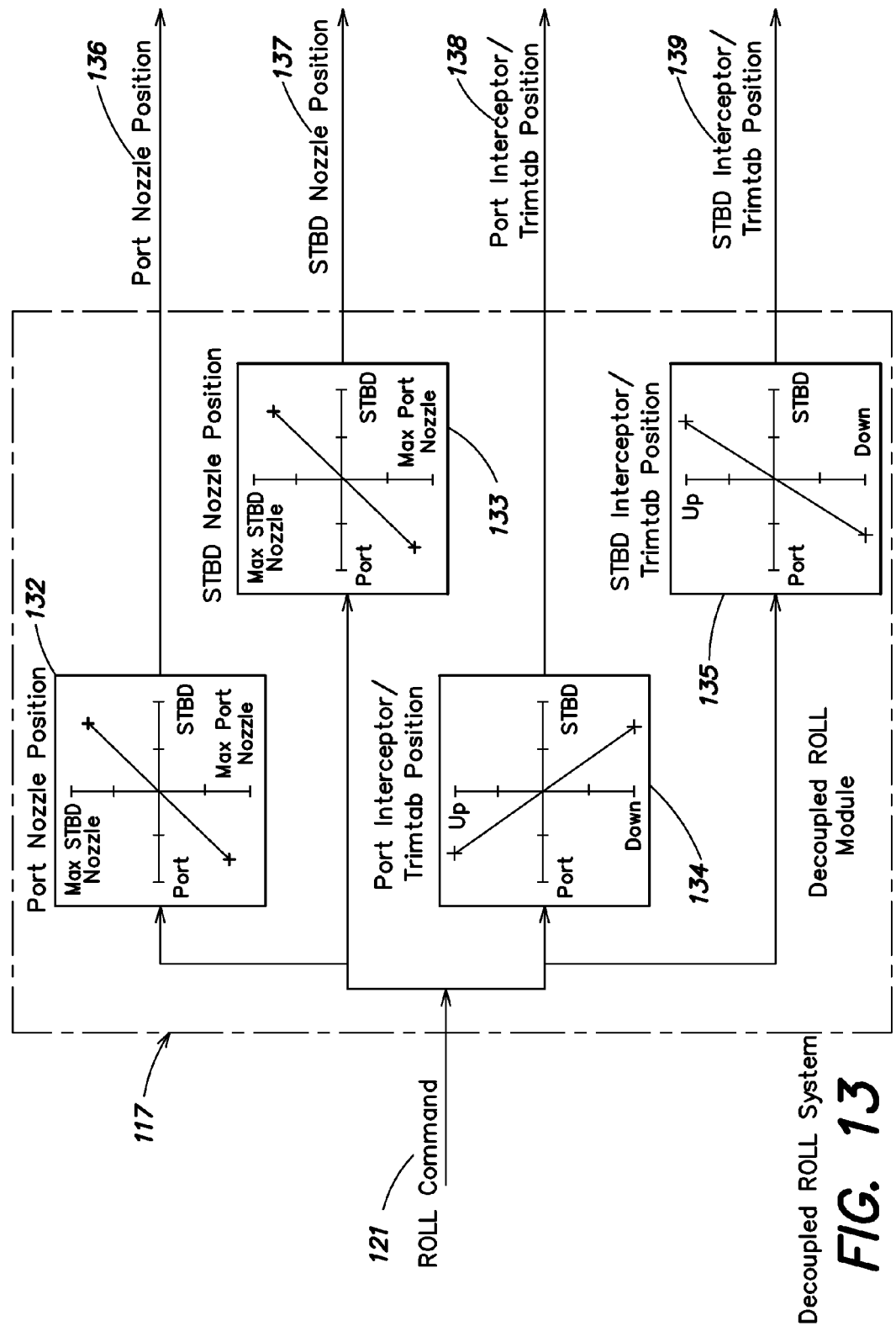
FIG. 13 illustrates an exemplary decoupled roll control function module and corresponding signals for a vessel comprising dual waterjet nozzles and dual trim deflectors.
Figure 14:
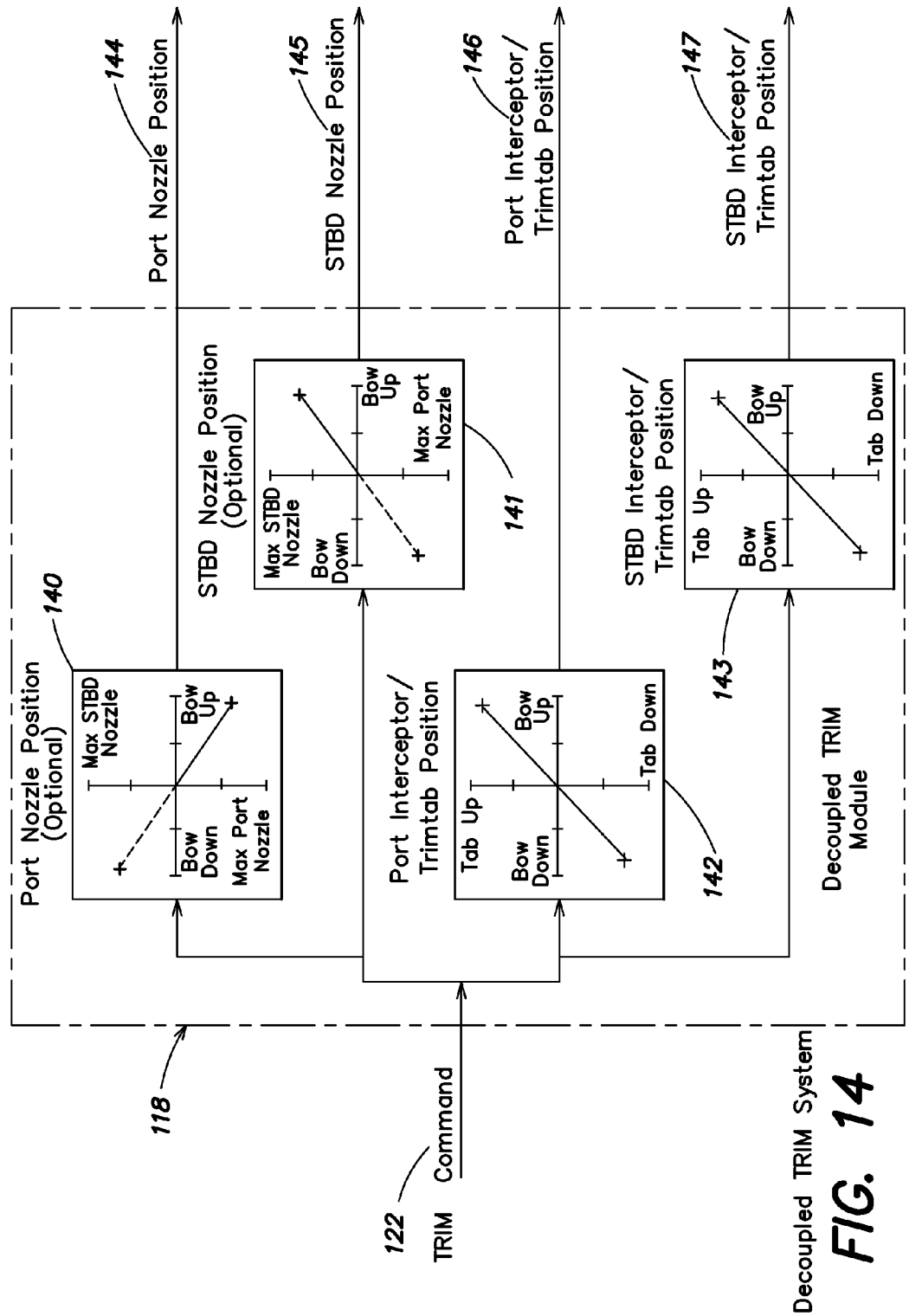
FIG. 14 illustrates an exemplary decoupled trim control function module and corresponding signals for a vessel comprising dual waterjet nozzles and dual trim deflectors.

Notwithstanding the above-described case where only small corrections are desired and significant efficiencies can be realized by actuating only the trimtabs or interceptors, desired substantial turning maneuvers and trim/roll corrections will according to some embodiments of the invention be effected with a combination of steering nozzle and trim tab or interceptor movements to achieve an optimum net result. In order to develop the desired trim, roll, and yaw forces independent of each other with devices that each produce trim, roll and yaw components, according to some embodiments of the invention, the controller effectively decouples the forces. FIGS. 12, 13 and 14 show example control modules that decouple the yaw, roll and trim forces respectively. The control modules are shown without the steering nozzle deadband feature described in FIG. 11 for small steering corrections, however, it is to be appreciated that this deadband feature can be added by simply adding a deadband to port and starboard nozzle position modules 124, 125 in the decoupled yaw algorithm 116 (i.e., replace modules 124 and 125 with modules 105 and 106 respectively). As previously explained, for the small corrections within the nozzle deadband, the rolling and yawing forces will not be decoupled, however, this is a generally acceptable condition for small steering corrections.

Figure 4F:
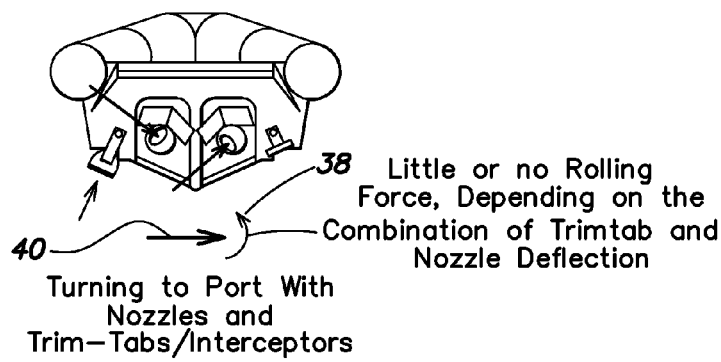

Referring now to FIG. 12, there is illustrated one embodiment of a decoupled yaw controller 116 according to the invention, which receives a yaw command 120 from the Helm 103 and becomes an input signal into four separate function modules that produce the actuator position signals for the port and starboard nozzles 124, 125 and the port and starboard trimtabs/interceptors 126, 127. Taking the example maneuver shown in FIGS. 4c and 4f, a yaw command to port will correspond to a Port Nozzle Position signal 128 and Starboard Nozzle Position signal 129 that each direct corresponding nozzles 12 and 14 to be tuned to port. The same yaw command to port will actuate the port and starboard trimtabs 20, 22 differentially. The Port trimtab Position module 126 will develop an output signal 130 that directs the trim tab in the down direction and conversely the STBD Trimtab Position module 127 will develop an output signal 131 that directs the trim tab in the up direction. As shown in FIGS. 4c and 4f, the net result is that the rolling forces developed by the nozzles and trim tabs are in opposite directions and effectively cancel each other out or produce a small or negligible rolling force 38 while the yawing components are in the same direction and combine to produce a significant yawing force 40. It is to be appreciated that the movements of steering nozzles and trim tabs as illustrated in FIGS. 4c and 4f are by way of example only to illustrate how the steering nozzles and trim tabs can be directed by these control modules to move in combination to effect a net yaw force with little or no rolling forces, e.g. in the port direction on the vessel 10, and that other net yawing forces with little or no rolling forces such as a force in starboard direction on the vessel can also be created by the appropriate actuation of the combination of the steering nozzles and trim deflectors or interceptors by these control modules.

Referring now to FIG. 13, there is illustrated one embodiment of a decoupled roll controller 117 according to the invention. As shown in FIG. 13, a roll command 121 from the Helm 103 and/or Trim/Roll controller 102 becomes an input signal into four separate function modules that produce the actuator command signals for the port and starboard nozzles 132, 133 and the port and starboard trimtabs/interceptors 134, 135. Taking by way of example, the maneuver shown in FIG. 4g, a roll command to starboard (clockwise) will correspond to a Port Nozzle Position signal 136 and a Starboard Nozzle Position signal 137 provided to nozzles 12 and 14 that corresponds to turning to starboard. The same roll command to starboard is provided to the port trimtab position module 134 and the starboard trimtab position module 135, which actuate the port and starboard trimtabs 20, 22 differentially such that the Port Trimtab Position module 134 develops an output signal 138 that corresponds to actuating the port trim tab in the down direction and the STBD Trimtab Position module 135 develops an output signal 139 that corresponds to actuating the starboard trim tab in the up direction. As shown in FIG. 4g, the net result is that the yawing forces developed by the steering nozzles and trimtabs are in opposite directions and effectively cancel each other out while the rolling components are in the same direction and combine to produce a significant clockwise rolling force 42. It is to be appreciated that the movements of steering nozzles and trim tabs as illustrated in FIG. 4g and as directed by the function modules of FIG. 13 are by way of example only to illustrate how the steering nozzles and trim tabs can be moved in combination to effect a net rolling force on the vessel 10 with little or substantially no yawing forces, and that other forces such as a rolling force on the vessel in counter clockwise direction with little or substantially no yawing can also be created by the appropriate actuation of the combination of the steering nozzles and trim deflectors or interceptors.

Referring now to FIG. 14, there is illustrated one embodiment of a decoupled trim controller 118. As shown in FIG. 14, the trim command 122 as provided, for example, by the Trim/Roll controller 102 becomes an input signal into four separate function control modules 140, 141, 142, and 143 that produce the actuator command signals for the port and starboard steering nozzles and the port and starboard trimtabs/interceptors. Taking by way of example the maneuver shown in FIGS. 1b and 1d, a bow-up command will correspond to a port nozzle position signal 144 that moves the Port Nozzle 12 to port and a starboard nozzle position signal 145 that moves the starboard nozzle 14 to starboard, creating a net down force at the transom. The port interceptor/trimtab function module 142 and the starboard trimtab/interceptor function module 143 will output a port interceptor/trimtab position signal 146 and a starboard interceptor/trimtab position signal 147 that correspond to moving both trimtabs 20, 22 in the up direction. Also shown functionally in FIG. 14 and by way of example is the maneuver illustrated in FIGS. 2b and 2d, wherein, for example, pushing the Trim/Roll controller in the bow-down direction will move the port nozzle in the starboard direction and the starboard nozzle in the port direction (turning the nozzles inward), thereby reducing the down force that is created on the vessel at the transom by the nozzles. Additionally, both the port and starboard trim tabs will be lowered as directed by the port and starboard interceptor/trimtab position modules 142, 143, thereby increasing the upward force on the vessel at the transom. Because the forces that are developed by the steering nozzles and the trimtabs are symmetric with respect to the vertical axis, the horizontal forces cancel out and a substantial upward or downward force as illustrated by the two examples above, is created without a significant yaw or roll component. As indicated by the dotted lines in function modules 140 and 141, it is typically not necessary to point the nozzles inward when creating an upward force at the transom, as the trimtabs are capable of developing significant upward force without impeding the water flow through the waterjet.

Figure 15:
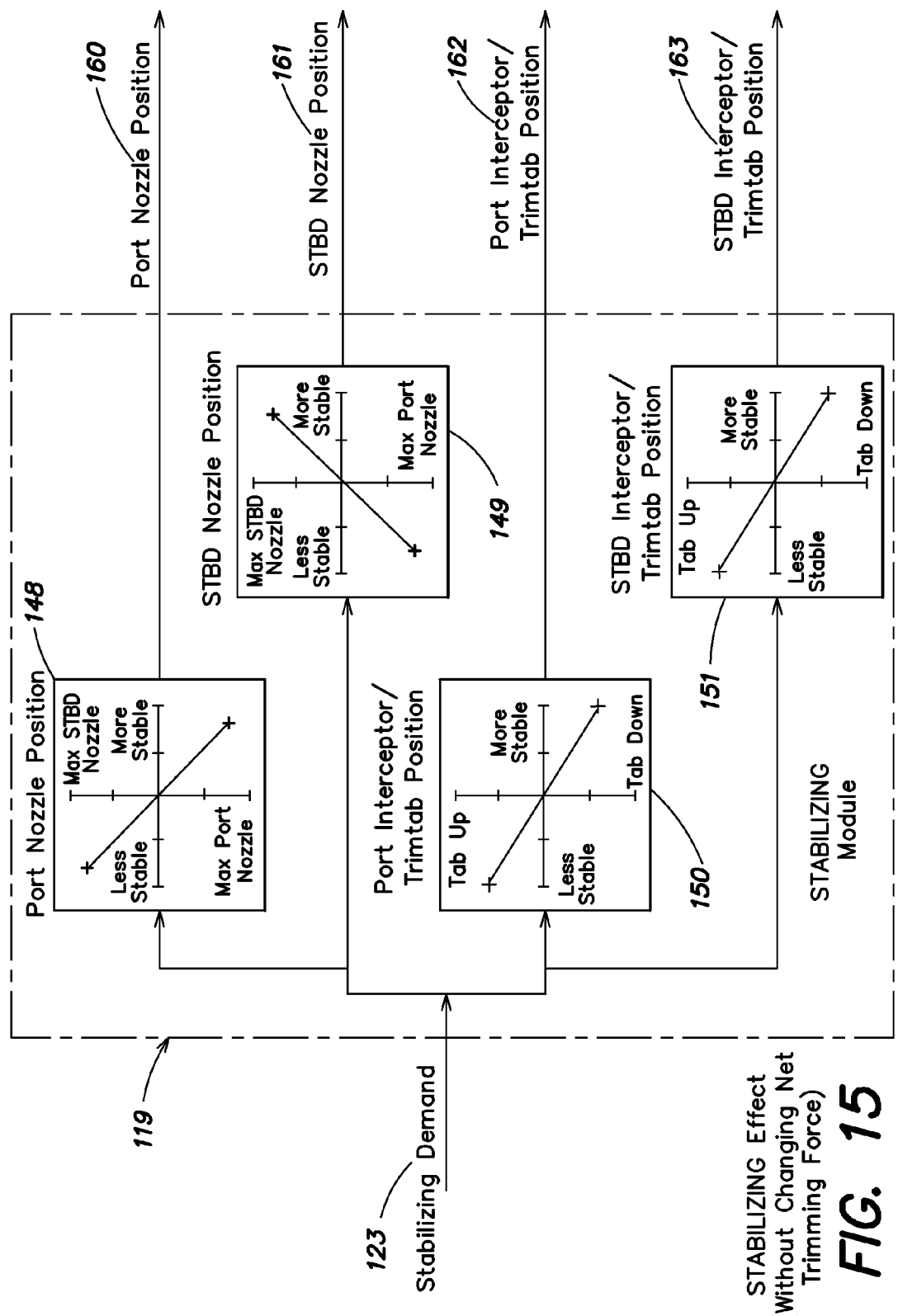
FIG. 15 illustrates an exemplary stabilizing effect control function module and corresponding signals for a vessel comprising dual waterjet nozzles and dual trim deflectors.

Referring now to FIG. 15, there is illustrated one embodiment of a stabilizing controller 119. As shown in FIG. 15, according to some embodiments of the invention a stabilizing control module 119 comprising control modules 148, 149, 150 and 151 can be implemented to create simultaneous upward forces on the stern of the vessel by lowering the trimtabs, and to create simultaneous downward forces by moving the steering nozzles 148, 149 outward. It is appreciated that while net the vertical forces created by these control module actuating the steering nozzles and trim tabs can be configured to effectively cancel out, one aspect of this embodiment as illustrated in FIG. 15 is that the timtabs 20 and 22 are now lowered into the water stream moving under the craft where they can significantly contribute to the craft stability. An example maneuver implemented by this embodiment of the controller is illustrated, for example, in FIGS. 3a and 3b. In addition to the correction forces developed by the trimtabs, it can also be seen from the movement illustrated in FIG. 3b, as has been described above with respect to FIG. 3b, that a change in heading of the vessel, for example (to port), due to an external disturbance on the vessel will impede the inlet flow of water into the port waterjet, decreasing the thrust developed by the port nozzle 12 such that an additional corrective force is created on the vessel. Thus one advantage of the control module of FIG. 15 is that it, either automatically or in response to a command from a controller, can actuate the steering nozzles and the trim tabs of a vessel to improve the craft stability without inducing any substantial or no trimming forces. The Stabilizing Demand signal can be provided by an individual control device such as a control knob/potentiometer or could be calculated internally in the control system, for example, based on a parameter such as craft speed.

Figure 16A:
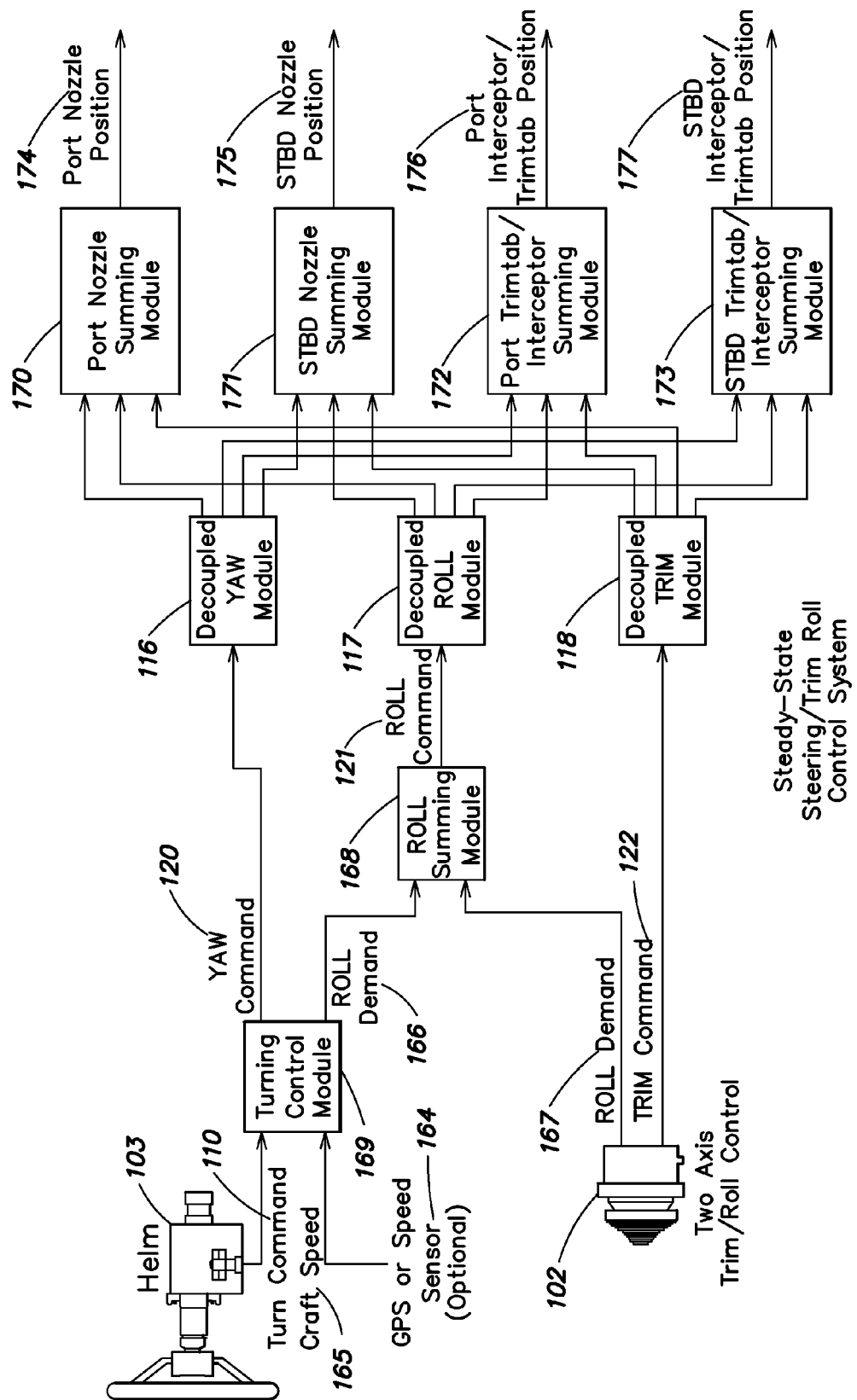
FIG. 16A illustrates one embodiment of control system for controlling a vessel comprising dual waterjet nozzles and dual trim deflectors.

Referring now to FIG. 16A, there is illustrated one embodiment of a steady state control system according to the invention. One embodiment of the control system of the invention integrates the three decoupled force control modules discussed above with respect to FIGS. 12-14, such that one set of control apparatus (e.g., helm controller 103 & trim/roll controller 102) will allow the craft operator to independently command one, two or all three of the decoupled forces (trim, roll, yaw) on the vessel without the individual forces significantly effecting each other. For the embodiment of the control system as shown in FIG. 16, trim, roll and yaw forces are applied to the craft and are controlled by the helm controller (steering wheel) 103 and two-axis trim/roll controller 102. A helm command signal 110 provided by the helm controller (steering wheel) 103 typically relates to course corrections or turning the craft. It is appreciated according to some embodiments of the control system that in most planing craft it is also desirable to apply a rolling force to the vessel when implementing a turning maneuver, as it is easier and safer to execute a turn if the craft is rolling in the direction of the turn (e.g., roll to port when turning to port). The amount of rolling force that should be provided to the vessel depends on factors such as hull shape, weight distribution (vertical center of gravity {VCG}), desired turning radius and vessel speed. According to some embodiments of the control system of the invention as illustrated in FIG. 16A, it is advantageous to implement a control module 169 that determines an amount of yaw and roll forces to be provided to the vessel in a turn.

Figure 16B:
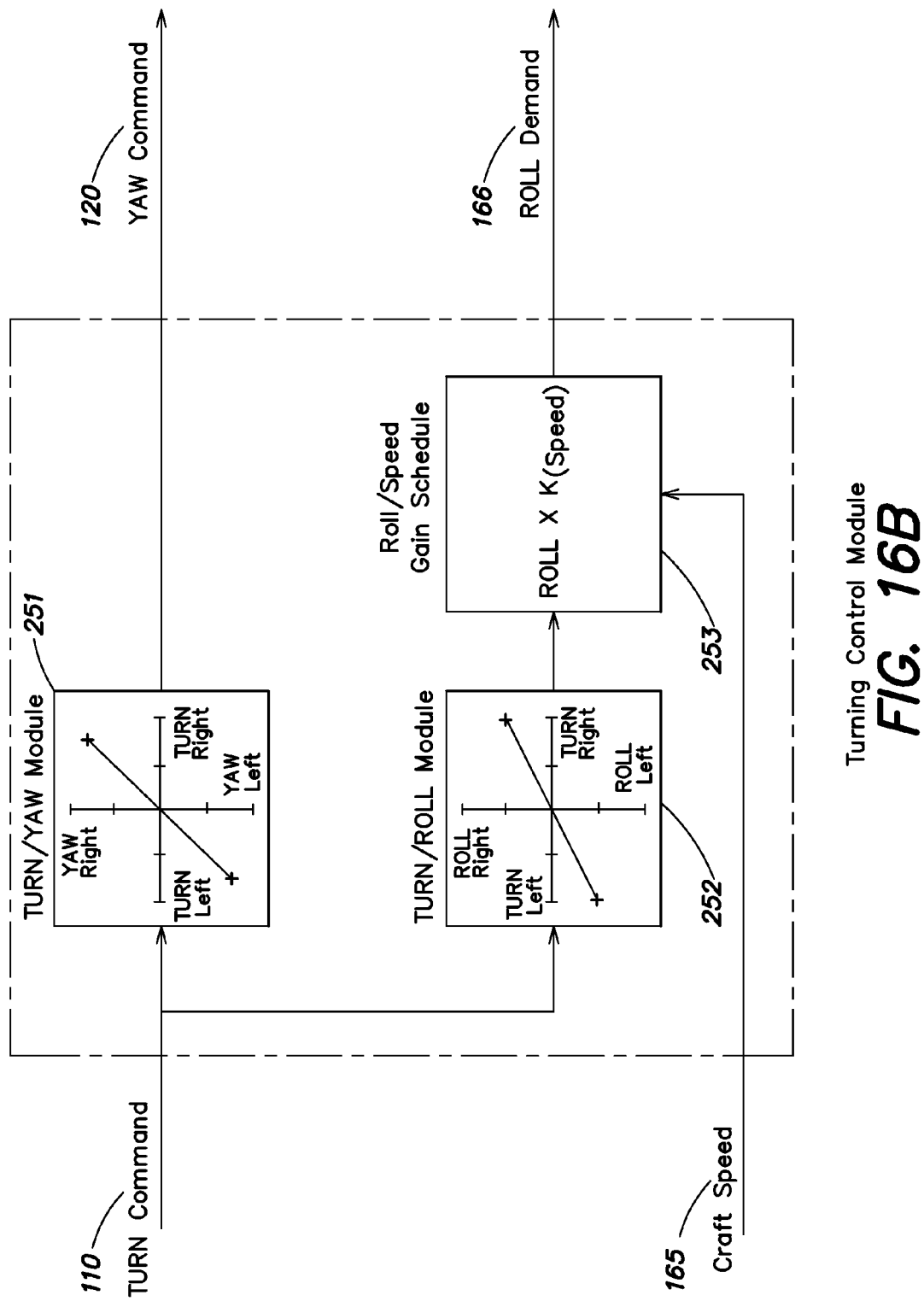
FIG. 16B illustrates an exemplary embodiment of a turning control function module and corresponding signals for a vessel comprising dual waterjet nozzles and dual trim deflectors, as implemented, for example, in the embodiment of the control system of FIG. 16A.

As illustrated in FIG. 16B, the turn control module receives the turn command and the craft speed, and from determines yaw and roll forces to execute the turn with a desired an optimum amount of roll. In particular, the turning control module 169 receives the turn command input 110 from the helm 103 and determines the required yaw force 120 via the turn/yaw module 251. The turn/roll module 252 generates a roll factor based on the turn command 110 that is forwarded to the Roll/Speed Gain Schedule 253 and multiplied by a gain ($K_{SPEED}$) that is determined by the craft speed 165 using either a gain schedule or mathematical relationship. Referring back to FIG. 16A, the roll demand 166 is then combined with the roll demand from the trim/roll control unit 167 at the summing module 168.

Figure 16C:
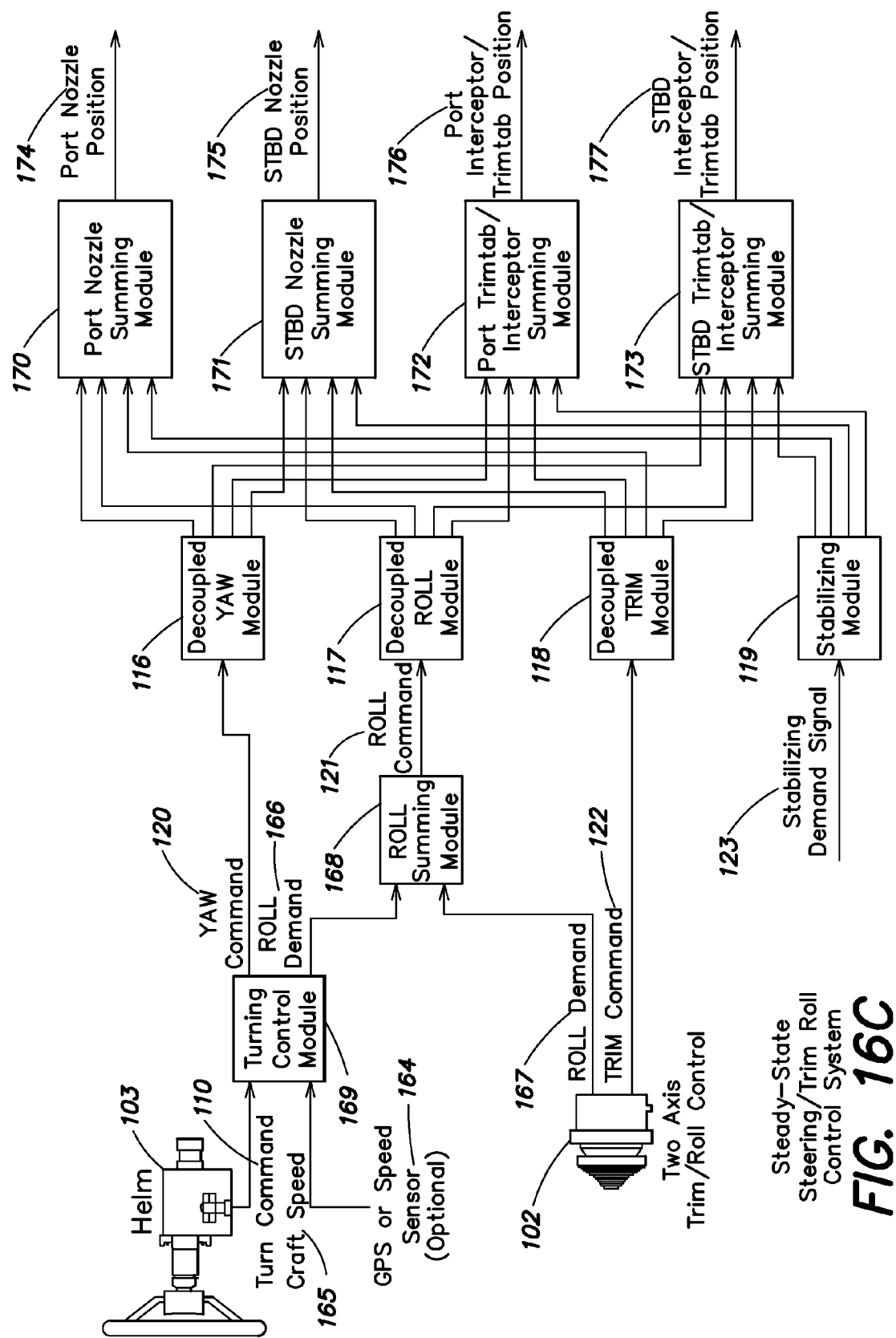
FIG. 16C illustrates another embodiment of control system including a stabilizing control module, for controlling a vessel comprising dual waterjet nozzles and dual trim deflectors.

It is also to be appreciated that according to some embodiments of the control system of the invention as illustrated, for example, in FIG. 16C, the stabilizing control module of FIG. 15 can be added to the control system shown in FIG. 16 without affecting the trim, roll and yaw control functions provided by the system. This is because there is no net trim, roll or yaw force applied to the craft when the craft is traveling in the straight-ahead direction. The stabilizing correction forces are developed as a result of a craft heading change, for example, do to an external disturbance.

Considering now the operation of the embodiment of the control system of FIG. 16, the turning control module 169 receives a steering command signal from the helm 110, a speed command signal 164 from, for example, a GPS receiver device or a speed sensor. Based on the desired turn rate 110 and craft speed 165, the required yaw 120 and roll 166 forces can be determined by the turning control module, which provides as an output a yaw command signal 120 and a roll command signal 166. In response to the yaw command signal 120, the yaw controller 116 will determine the nozzle and trimtab/interceptor movements to be actuated to develop the desired yaw force on the vessel without significantly affecting the net trim and roll forces applied to the vessel, as has been discussed herein. A total roll command signal 121 is provided by a roll summing control device 168, which is a sum of the roll command signal 166 for the turn and a steady state roll command signal 167 from the two axis controller 102. These two signals are summed by the roll summing control module 168 and fed into the decoupled roll control module 117, wherein the actuator signals are determined for the nozzles and trimtab/interceptors to develop the roll force to be induced to the vessel without significantly effecting the net yaw and trim force induced to the vessel, as has been previously described in reference to FIG. 13. A third trim command 122 signal, is provided by the up-down axis of the trim/roll switch 102 and forwarded directly to the decoupled trim control module 118, wherein the actuator signals are determined for the nozzles and trimtabs/interceptors to develop the trim forces to be induced to the vessel without significantly affecting the net yaw and roll forces that are to be induced to the vessel. The port nozzle actuation signals that are to be provided to the port steering nozzle to fulfill the trim, roll and yaw demands are summed at the port nozzle summing device 170 and forwarded to the port nozzle actuator controller as the port nozzle position signal 174. Similarly, the starboard nozzle actuation signals, the port trimtab/interceptor actuation signals and the starboard trimtab/interceptor actuation signals are summed by a respective starboard nozzle summing device 171, port trimtab/interceptor summing device 172, and starboard trimtab/interceptor summing device 173, and forwarded to the respective actuator controllers as starboard nozzle position signal 175, port interceptor/trimtab position signal 176 and starboard interceptor position signal 177.

Figure 17A:
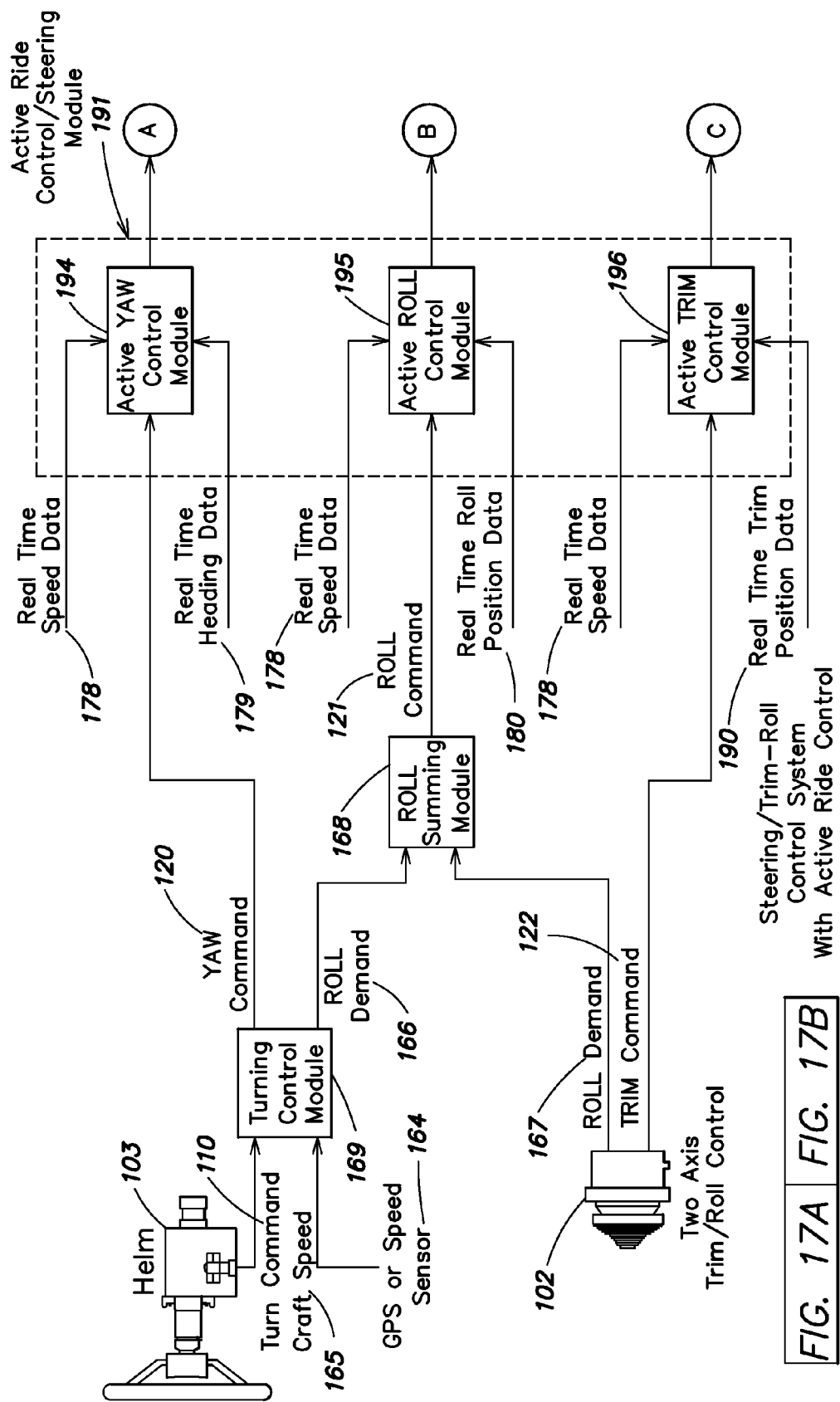
FIG. 17 illustrates another embodiment of control system including an active control module, for controlling a vessel comprising dual waterjet nozzles and dual trim deflectors.
Figure 17B:
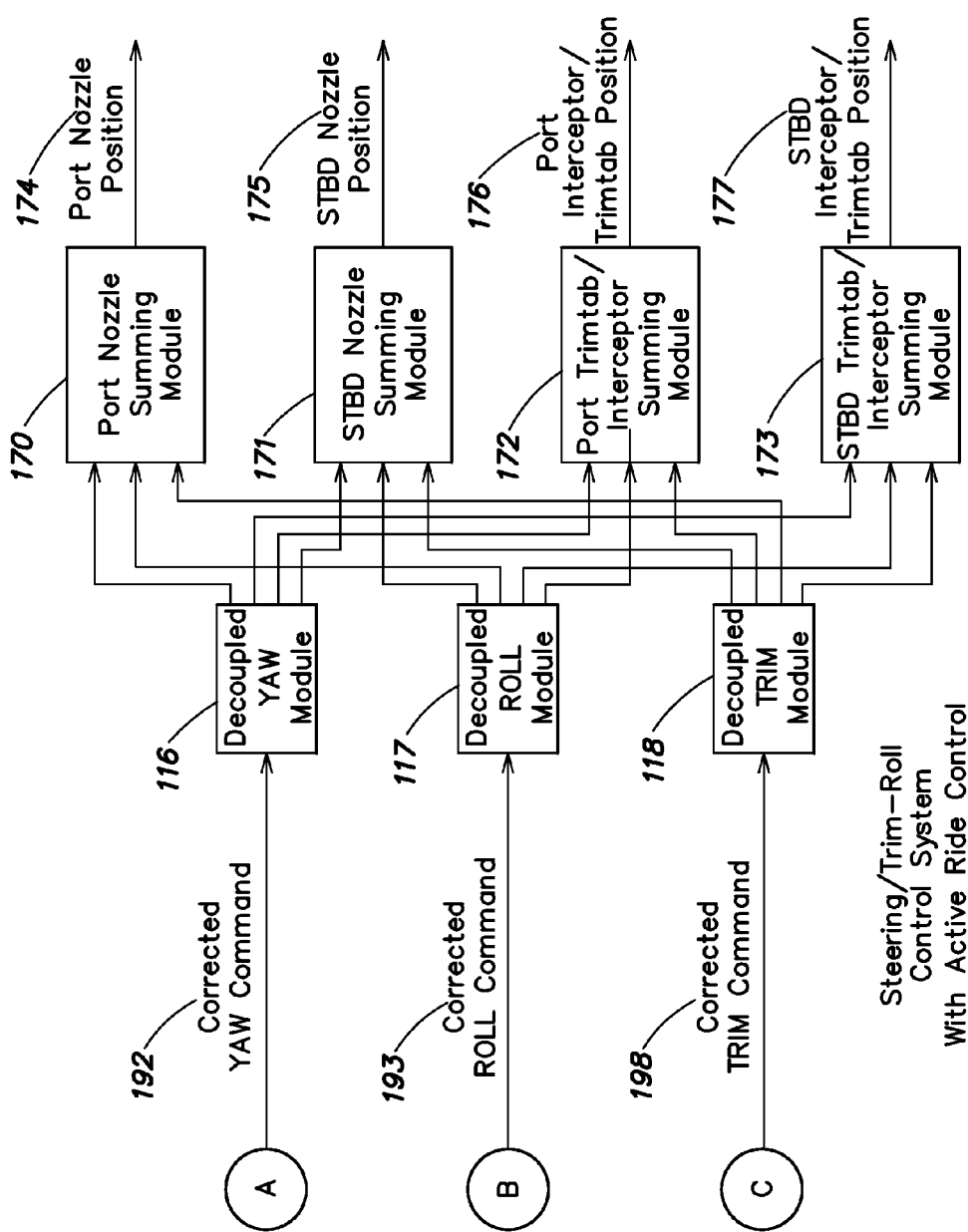

Referring now to FIG. 17, there is illustrated another embodiment of a control system of the invention. This embodiment of the control system also includes an active ride control system 191, wherein actual craft motion is sensed and the yaw command signal 120, roll command signal 121, and trim command signal 122, as discussed above with respect to FIG. 16, are modified in real time in response to the actual craft motion. It is to be appreciated that the embodiment of the control system illustrated in FIG. 17 has the same decoupled force modules 116, 117, 118 and summing modules 168, 170, 171, 172, 173 as the system illustrated in FIG. 16, and that for the sake of brevity the description of these modules will not be repeated. One additional feature that is provided by the control system of FIG. 17, however, is that the active force control modules 194, 195, 196 receive real-time speed and position data and adjust (correct) the yaw 120, roll 121, and trim 122 command signals to compensate for differences between the actual craft response and the commanded (desired) craft response.

Another advantage of the control system of FIG. 17 is that the ride control module 191 will effectively respond to and compensate for outside disturbances such as wind and waves that will affect the craft motion. For example, it is illustrative to compare the operation of the control system of FIG. 16, without the active ride control module, to the control system of FIG. 17 with the active ride control module. By way of example, let's take the roll command signal 121, which may correspond to a zero roll force value (i.e., there is no roll force requirement to achieve the desired craft orientation). If the craft were to roll to port in response to an influence external to the control system such as a wave or wind gust, the embodiment of the control system illustrated in FIG. 16 would need the operator of the system to push the trim/roll controller 102 in the starboard direction to compensate for the external disturbance force, if it is to be compensated for, which would result in the control system issuing the position control signal to move the port interceptor down, the starboard interceptor up, and both of the port and starboard steering nozzles to the starboard direction. In contrast, the system illustrated in FIG. 17, will sense the roll movement of the vessel, for example, via a roll or incline sensor and forward the roll position signal 180 to the active roll control module 195. The active roll control module 195 will then modify the roll command signal 121 to include a starboard roll force to counter the port craft roll due to the external wind/wave disturbance and forward the corrected roll command signal 193 to the decoupled roll module 117. It is to be appreciated that the operation of the system of FIG. 17 has been described by way of example to an external rolling force operating on the vessel, which is corrected by the system and the system will work similarly to provide yaw and trim corrections for external yaw and trimming forces induced to the vessel. It is to be appreciated that although the ride control module receives data for and compensates for all of trim, roll, and yaw, that the ride control module can receive data for and compensate for any one of or any combination of these parameters.

It should be appreciated that the concept described herein, in particular, individually controlling trim tabs in combination with steering nozzles to induce desired trimming, yawing and rolling forces to a vessel, as well as to mitigate undesired trimming, yawing and rolling forces, can also be used with other types of propulsed vessels. For example, by individually activating trim tabs in combination with outboard motors, inboard/outboard drives, stern drives, including single and dual-propeller type drives, as well as Arneson drives. It is to be appreciated that the shape and curves of each of the control modules are shown by way of example, and that the shape of the curves and locations of key operating points of these various modules as described herein can change based on the specifics of the application, such as, the shape and size of the hull, speed of the vessel, and various other parameters of the application in which the system and method of the invention are to be used.

According to another aspect of the invention, it should be appreciated that the shape of the trim tabs can be modified, e.g. optimized, to vary and optimize performance of the herein described forces provided to the vessel. For example, a fin can be added to the trim tabs to improve the stability provided by the trim tabs to the vessel. Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of acts or system elements, it should be understood that those acts and those elements may be combined in other ways to accomplish the same objectives. Acts, elements and features discussed only in connection with one embodiment are not intended to be excluded from a similar role in other embodiments.

It should also be appreciated that the use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name.

What is claimed is:

1. A method for controlling a marine vessel having first and second steerable propulsors and first and second trim deflectors, comprising:
   generating at least a first set of actuator control signals and a second set of actuator control signals;
   coupling the first set of actuator control signals to the first and second steerable propulsors and controlling the first and second steerable propulsors using the first set of actuator control signals; and
   coupling the second set of actuator control signals to the first and second trim deflectors and controlling the first and second trim deflectors using the second set of actuator control signals;
   wherein the method further comprises at least one of:
   inducing a net yawing force to the marine vessel by controlling at least one of the first and second steerable propulsors while at least partially countering a rolling force produced by the at least one of the first and second steerable propulsors by controlling at least one of the first and second trim deflectors; or
   inducing a net rolling force to the marine vessel by controlling at least one of the first and second trim deflectors while at least partially countering a yawing force produced by the at least one of the first and second trim deflectors by controlling at least one of the first and second steerable propulsors.

2. The method of claim 1, further comprising inducing a second net yawing force to the marine vessel to port or to starboard by maintaining the first and second steerable propulsors in a neutral position and controlling one of the first and second trim deflectors.

3. The method of claim 1, wherein the method further comprises:
   inducing a net trimming force in a down direction to a stern of the marine vessel by controlling each of the first and second steerable propulsors.

4. The method of claim 1, further comprising increasing the stability of the marine vessel by controlling each of the first and second steerable propulsors and by controlling each of the first and second trim deflectors.

5. The method of claim 1, further comprising receiving a first vessel control signal from a first vessel control apparatus having at least two degrees of freedom, the first vessel control signal corresponding to a movement of the first vessel control apparatus along at least one degree of freedom.

6. The method of claim 5, further comprising receiving a second vessel control signal that corresponds to movement of a second vessel control apparatus along a rotational degree of freedom.

7. The method of claim 5, wherein the act of generating the first set of actuator control signals and the second set of actuator control signals comprises generating the first set of actuator control signals and the second set of actuator control signals such that a first degree of freedom of the first vessel control apparatus controls a net rolling force induced to the marine vessel, and a second degree of freedom of the first vessel control apparatus controls a net trimming force induced to the marine vessel.

8. The method of claim 5, further comprising receiving a second vessel control signal from an autopilot controller.

9. The method of claim 1, wherein each of the first and second steerable propulsors comprises a propeller or a waterjet with a steering nozzle.

10. The method of claim 1, further comprising controlling at least one of the first and second steerable propulsors and at least one of first and second trim deflectors in combination so as to induce a desired amount of roll in a turn.

11. The method of claim 1, wherein the first and second trim deflectors are configured to generate a hydrodynamic lifting force.

12. The method of claim 11, wherein each of the first and second trim deflectors comprises a trim tab or an interceptor.

13. A system for controlling a marine vessel having first and second steerable propulsors and first and second trim deflectors, comprising:
   a processor that is configured to provide a first set of actuator control signals and a second set of actuator control signals,
   wherein the first set of actuator control signals is coupled to the first and second steerable propulsors and controls the first and second steerable propulsors and the second set of actuator control signals is coupled to the first and second trim deflectors and controls the first and second trim deflectors,
   wherein the processor is configured to provide the first set of actuator control signals and the second set of actuator control signals to induce, to the marine vessel, at least one of:
   a net yawing force by controlling at least one of the first and second steerable propulsors while at least partially countering a rolling force produced by the at least one of the first and second steerable propulsors by controlling at least one of the first and second trim deflectors; or
   a net rolling force by controlling at least one of the first and second trim deflectors while at least partially countering a yawing force produced by the at least one of the first and second trim deflectors by controlling at least one of the first and second steerable propulsors.

14. The system of claim 13, wherein the processor is configured to provide the first set of actuator control signals and the second set of actuator control signals so that a net yawing movement of the vessel is induced to port or to starboard, wherein the first and second steerable propulsors are maintained in a neutral position and one of the first and second trim deflectors is actuated to induce the net yawing movement.

15. The system of claim 13, wherein the processor is configured to provide the first set of actuator control signals and the second set of actuator control signal to induce a net trimming force to the stern of the marine vessel in both an up direction and a down direction by controlling each of the first and second steerable propulsors and by controlling the first and second trim deflectors.

16. The system of claim 13, wherein the processor is configured to provide the first set of actuator control signals and the second set of actuator control signals to increase the stability of the marine vessel by controlling each of the first and second steerable propulsors and by controlling each of the first and second trim deflectors.

17. The system of claim 13, further comprising a first vessel control apparatus having at least two degrees of freedom that provides a first vessel control signal corresponding to a movement of the first vessel control apparatus along at least one degree of freedom.

18. The system of claim 17, wherein the first vessel control apparatus comprises a two-axis control device.

19. The system of claim 18, wherein the processor is configured to provide the first actuator control signals and the second actuator control signals such that a first axis of the two-axis control device controls a net rolling force induced to the marine vessel and a second axis of the two-axis control device controls a net trimming force induced to the marine vessel.

20. The system of claim 13, further comprising a vessel control apparatus providing a vessel control signal corresponding to movement of the vessel control apparatus.

21. The system of claim 20, wherein the vessel control apparatus has a rotational degree of freedom and provides the vessel control signal corresponding to movement of the vessel control apparatus along a rotational degree of freedom.

22. The system of claim 13, further comprising an interface coupled to the processor that provides for communication with an autopilot controller.

23. The system of claim 13, wherein each of the first and second trim deflectors comprises a trim tab or an interceptor.

24. The system of claim 13, wherein each of the first and second steerable propulsors comprises a propeller or a waterjet with a steering nozzle.

25. The system of claim 13, wherein the processor is configured to control at least one of the first and second steerable propulsors and at least one of first and second trim deflectors in combination so as to induce a desired amount of roll in a turn.

26. The system of claim 24, wherein each of the first and second steerable propulsors comprises an outboard motor, inboard/outboard drive, or a stern drive.

27. A method for controlling a marine vessel having first and second steerable propulsors and first and second trim deflectors, comprising:
   generating at least a first set of actuator control signals and a second set of actuator control signals;
   coupling the first set of actuator control signals to the first and second steerable propulsors and controlling the first and second steerable propulsors using the first set of actuator control signals;
   coupling the second set of actuator control signals to the first and second trim deflectors and controlling the first and second trim deflectors using the second set of actuator control signals; and
   inducing a net rolling force to the marine vessel by controlling at least one of the first and second trim deflectors while at least partially countering a yawing force produced by the at least one of the first and second trim deflectors by controlling at least one of the first and second steerable propulsors.

28. A system for controlling a marine vessel having first and second steerable propulsors and first and second trim deflectors, comprising:
   a processor that is configured to provide a first set of actuator control signals and a second set of actuator control signals,
   wherein the first set of actuator control signals is coupled to the first and second steerable propulsors and controls the first and second steerable propulsors, and the second set of actuator control signals is coupled to the first and second trim deflectors and controls the first and second trim deflectors,
   wherein the processor is configured to provide the first set of actuator control signals and the second set of actuator control signals to induce a net rolling force to the marine vessel by controlling at least one of the first and second trim deflectors while at least partially countering a yawing force produced by the at least one of the first and second trim deflectors by controlling at least one of the first and second steerable propulsors.

* * * * *